US012640165B2

(12) United States Patent
Rusnak et al.

(10) Patent No.: US 12,640,165 B2
(45) Date of Patent: May 26, 2026

(54) HANDLING WRITE COMMANDS DURING A REFRESH OPERATION IN A SHINGLED MAGNETIC RECORDING DRIVE

(71) Applicants: Kabushiki Kaisha Toshiba, Tokyo (JP); Toshiba Electronic Devices & Storage Corporation, Tokyo (JP)

(72) Inventors: Kurt Michael Rusnak, Dublin, CA (US); Fernando A. Zayas, Rangiora (NZ); Richard M. Ehrlich, Edina, MN (US)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 140 days.

(21) Appl. No.: 18/769,628

(22) Filed: Jul. 11, 2024

(65) Prior Publication Data

US 2026/0018186 A1      Jan. 15, 2026

(51) Int. Cl.
| | |
|---|---|
| *G11B 5/012* | (2006.01) |
| *G11B 5/024* | (2006.01) |
| *G11B 5/027* | (2006.01) |

(52) U.S. Cl.
CPC .............. *G11B 5/012* (2013.01); *G11B 5/024* (2013.01); *G11B 5/0275* (2013.01); *G11B 2220/216* (2013.01); *G11B 2220/235* (2013.01)

(58) Field of Classification Search
CPC ....... G11B 5/012; G11B 5/024; G11B 5/0275; G11B 2220/216; G11B 2220/235
USPC ................................................. 365/218, 222
See application file for complete search history.

(56) References Cited

U.S. PATENT DOCUMENTS

| | | | | |
|---|---|---|---|---|
| 6,996,666 | B2 * | 2/2006 | Sasaki | G06F 3/0616 |
| | | | | 711/112 |
| 7,129,749 | B1 * | 10/2006 | Fenstermaker | H03K 19/17748 |
| | | | | 326/82 |
| 8,665,545 | B2 * | 3/2014 | Coker | G11B 19/045 |
| | | | | 360/48 |
| 8,706,985 | B1 | 4/2014 | Boyle | |
| 9,268,709 | B2 | 2/2016 | Xi | |
| 9,383,923 | B1 | 7/2016 | Malina | |
| 9,978,417 | B1 * | 5/2018 | Qiang | G11B 5/012 |
| 10,102,145 | B1 * | 10/2018 | Michel | G06F 3/064 |
| 10,204,054 | B2 * | 2/2019 | Tan | G06F 12/0875 |
| 10,416,560 | B2 * | 9/2019 | Matsumoto | G03F 7/027 |
| 10,770,111 | B1 * | 9/2020 | Zayas | G11B 20/1889 |
| 10,872,622 | B1 * | 12/2020 | Li | G06F 3/0649 |

(Continued)

*Primary Examiner* — Michael T Tran
(74) *Attorney, Agent, or Firm* — Kim & Stewart LLP

(57) ABSTRACT

Write commands in a shingled magnetic recording (SMR) drive are efficiently executed when a write command and associated write data are received by an SMR HDD from a host while the target SMR band for storing the write data is undergoing a refresh operation. In response to the write command, the HDD suspends the refresh operation, stores the write data in nonvolatile memory, and informs the host that the write command has been completed. After the write data are stored in nonvolatile memory, the HDD resumes the refresh operation, and the remaining unrefreshed data in the target SMR band are refreshed by being rewritten to the spare SMR band. The nonvolatile memory can include the spare SMR band in some instances, the target SMR band in some instances, and in both the spare SMR band and the target SMR band in some instances.

20 Claims, 19 Drawing Sheets

(56) References Cited

U.S. PATENT DOCUMENTS

| | | | |
|---|---|---|---|
| 11,024,337 B1 * | 6/2021 | Aoki | G11B 20/1258 |
| 2010/0165502 A1 * | 7/2010 | Iketaki | G11B 19/045 |
| 2010/0188914 A1 * | 7/2010 | Ahn | G11C 7/20 |
| | | | 365/222 |
| 2012/0072660 A1 * | 3/2012 | Lin | G11B 20/10527 |
| | | | 711/E12.001 |
| 2015/0113201 A1 * | 4/2015 | Kong | G11B 5/09 |
| | | | 360/60 |
| 2015/0121088 A1 * | 4/2015 | Baryudin | G06F 12/1408 |
| | | | 713/193 |
| 2015/0378964 A1 * | 12/2015 | Chanda | G06Q 20/145 |
| | | | 715/209 |
| 2016/0343400 A1 * | 11/2016 | Kojima | G11B 20/1889 |
| 2018/0260332 A1 * | 9/2018 | Dunn | G06F 3/0685 |
| 2019/0278711 A1 * | 9/2019 | Schmidt | G06F 12/0871 |
| 2020/0279577 A1 * | 9/2020 | Tomoda | G11B 20/1217 |
| 2021/0182190 A1 * | 6/2021 | Gao | G06F 12/0246 |
| 2021/0280215 A1 * | 9/2021 | Fukawa | G11B 20/1217 |

* cited by examiner

400

430

420

401

Track 421
Track 422
Track 423
Track 424
Track 425
Track 426
Track 427
Track 428
Track 429

404

403 127

402

430

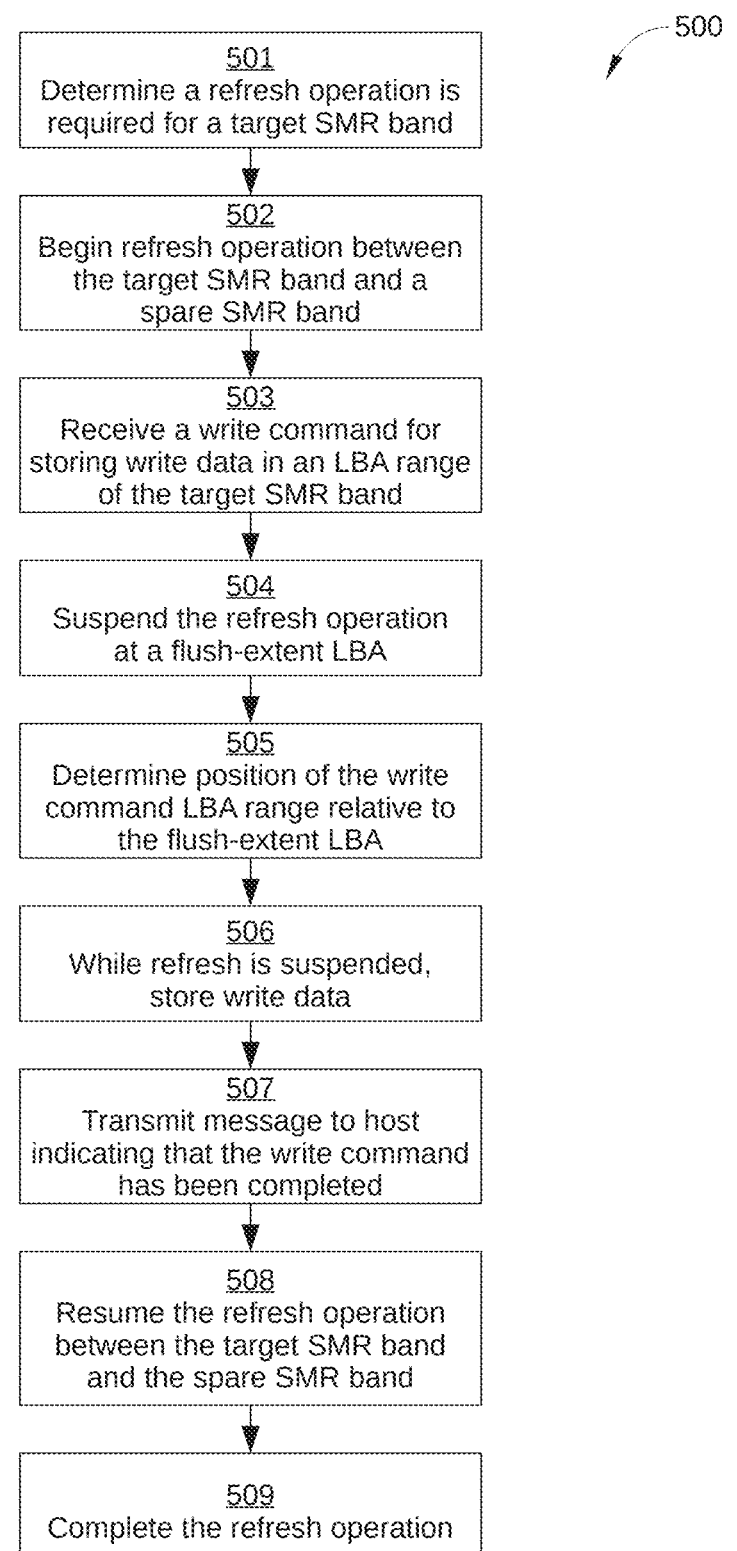

500

501
Determine a refresh operation is
required for a target SMR band

502
Begin refresh operation between
the target SMR band and a
spare SMR band

503
Receive a write command for
storing write data in an LBA range
of the target SMR band 504
Suspend the refresh operation
at a flush-extent LBA 505
Determine position of the write
command LBA range relative to
the flush-extent LBA 506
While refresh is suspended,
store write data 507
Transmit message to host
indicating that the write command
has been completed 508
Resume the refresh operation
between the target SMR band
and the spare SMR band 509
Complete the refresh operation

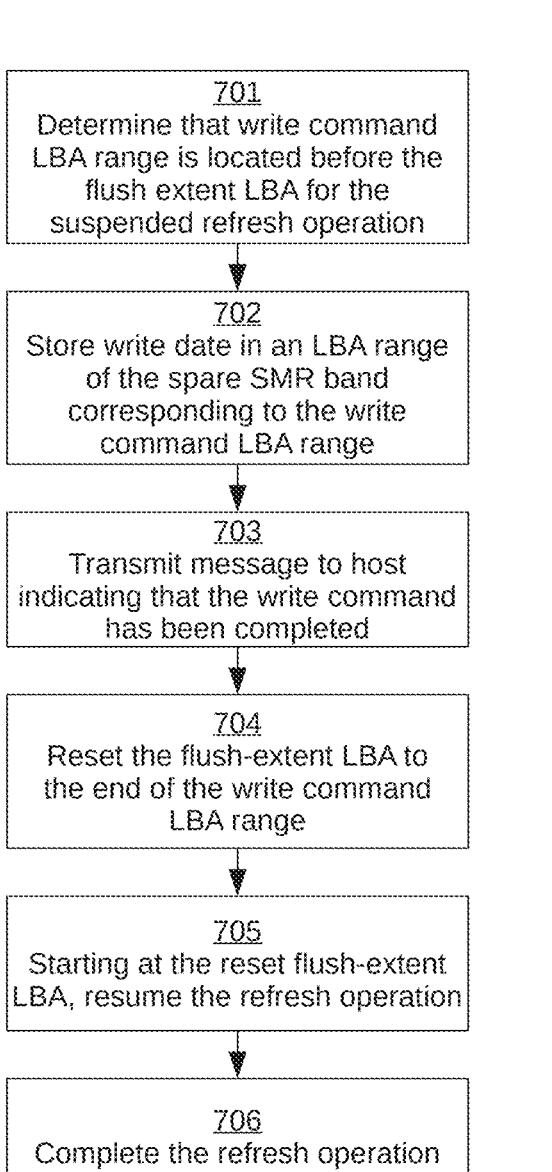

701
Determine that write command LBA range is located before the flush extent LBA for the suspended refresh operation

702
Store write date in an LBA range of the spare SMR band corresponding to the write command LBA range

703
Transmit message to host indicating that the write command has been completed

704
Reset the flush-extent LBA to the end of the write command LBA range

705
Starting at the reset flush-extent LBA, resume the refresh operation

706
Complete the refresh operation

FIG. 7

Existing Host Data
Dummy Data
New Host Data

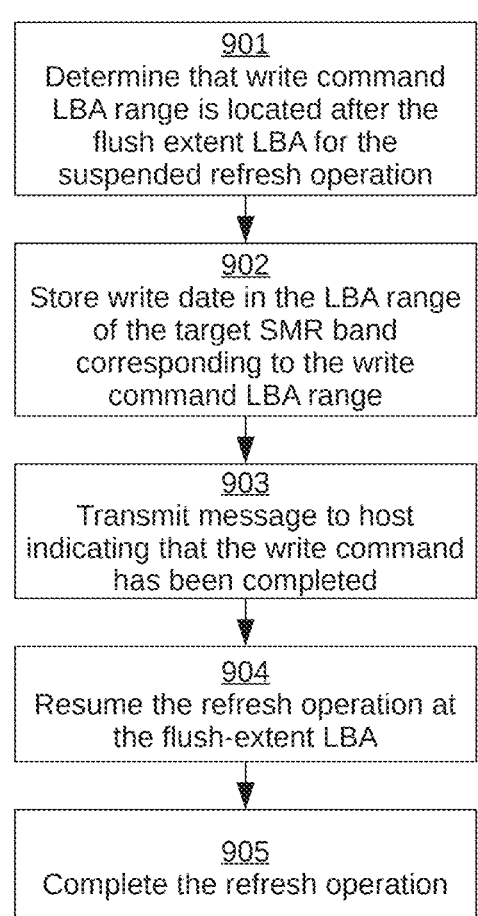

901
Determine that write command LBA range is located after the flush extent LBA for the suspended refresh operation

902
Store write date in the LBA range of the target SMR band corresponding to the write command LBA range

903
Transmit message to host indicating that the write command has been completed

904
Resume the refresh operation at the flush-extent LBA

905
Complete the refresh operation

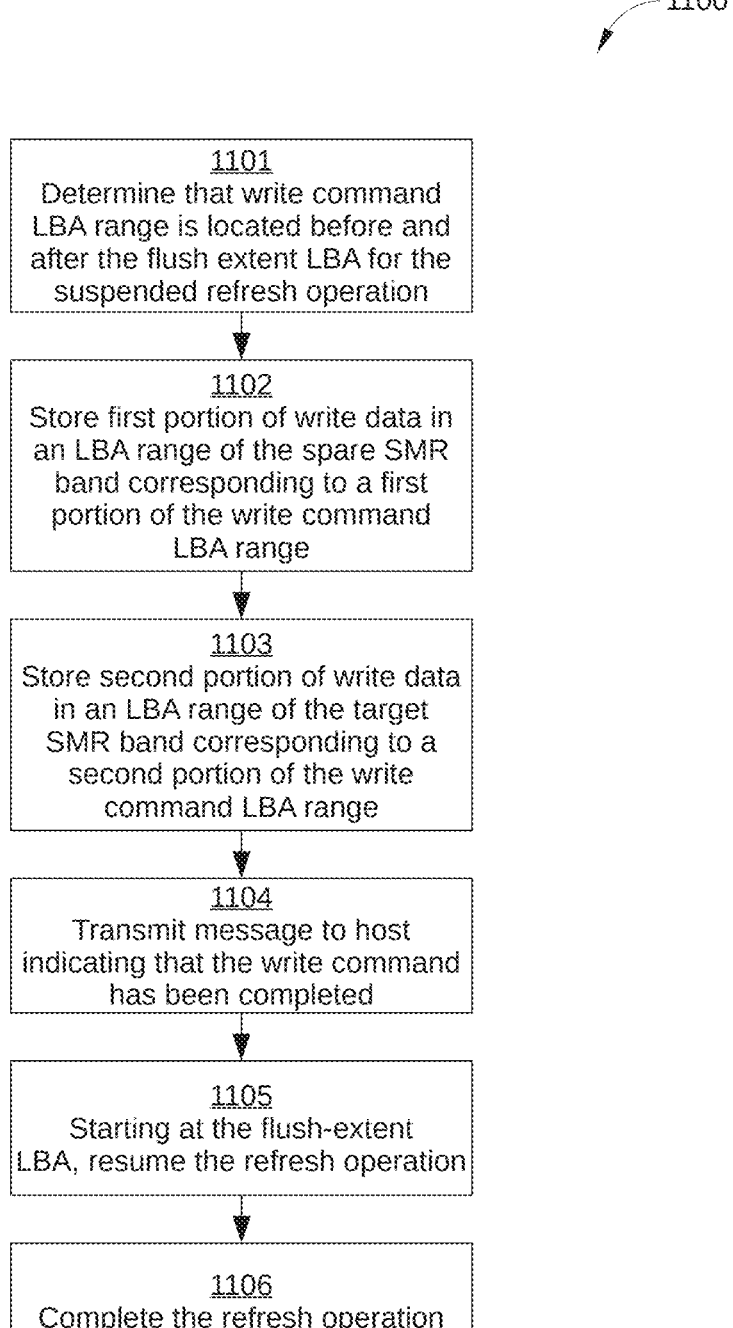

1101
Determine that write command LBA range is located before and after the flush extent LBA for the suspended refresh operation 1102
Store first portion of write data in an LBA range of the spare SMR band corresponding to a first portion of the write command LBA range 1103
Store second portion of write data in an LBA range of the target SMR band corresponding to a second portion of the write command LBA range 1104
Transmit message to host indicating that the write command has been completed 1105
Starting at the flush-extent LBA, resume the refresh operation 1106
Complete the refresh operation

FIG. 11

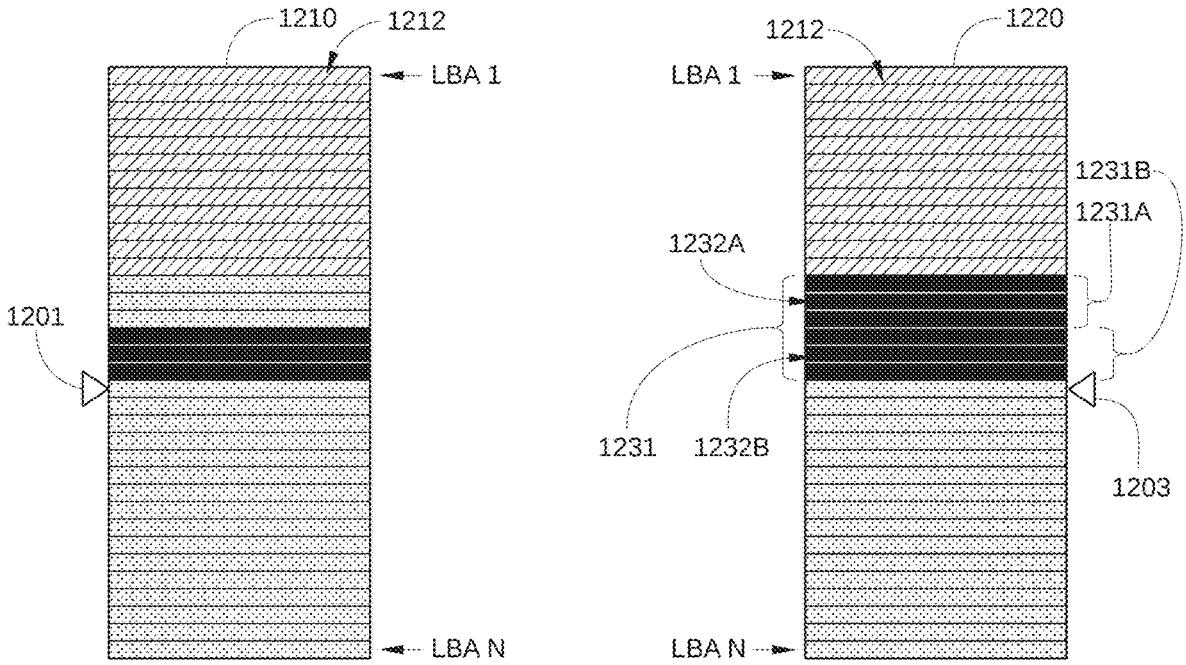
FIG. 12C
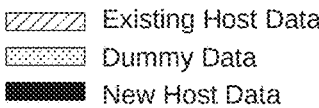
Existing Host Data
Dummy Data
New Host Data

1300

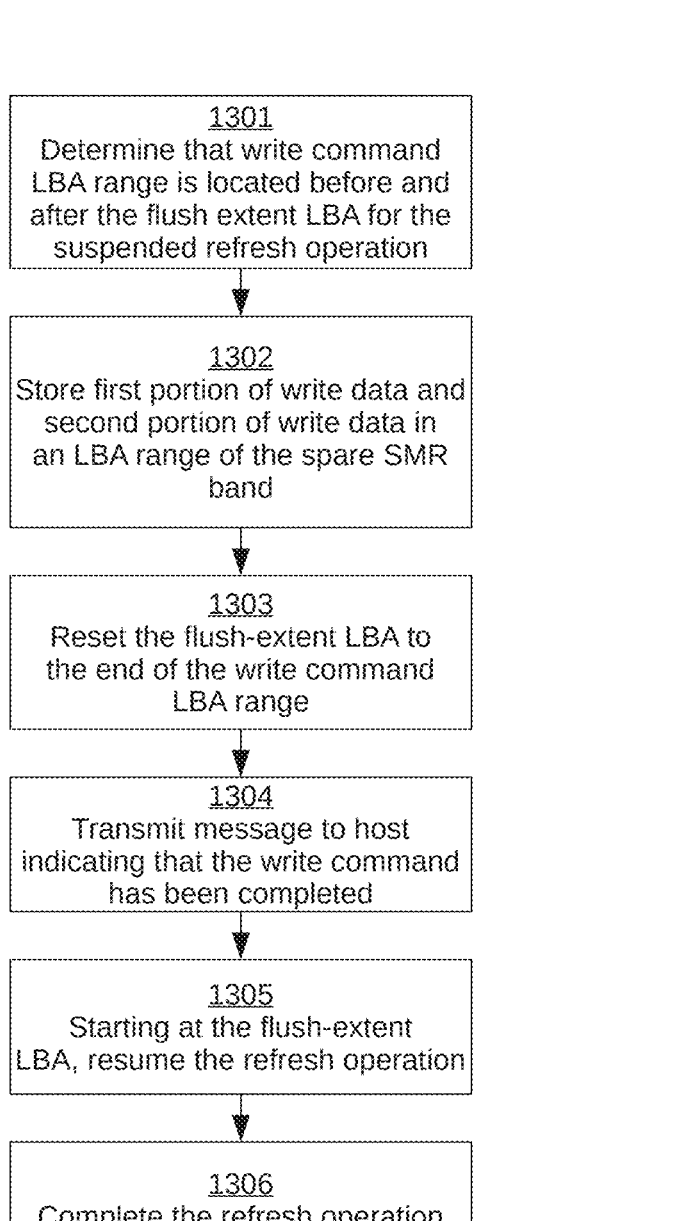

1301
Determine that write command LBA range is located before and after the flush extent LBA for the suspended refresh operation 1302
Store first portion of write data and second portion of write data in an LBA range of the spare SMR band 1303
Reset the flush-extent LBA to the end of the write command LBA range 1304
Transmit message to host indicating that the write command has been completed 1305
Starting at the flush-extent LBA, resume the refresh operation 1306
Complete the refresh operation

FIG. 13

HANDLING WRITE COMMANDS DURING A REFRESH OPERATION IN A SHINGLED MAGNETIC RECORDING DRIVE

BACKGROUND

Magnetic hard disk drives (HDDs) have been employed in information technology as a low-cost means for providing random access to large quantities of data. Consequently, as digital technologies have greatly expanded the need for data storage in all aspects of modern life, areal density of information stored in HDDs has continuously increased. However, there is a physical limitation for the minimum width of a write head when using conventional data recording techniques, such as perpendicular magnetic recording (PMR). This minimum width has prevented further decreases in written track width and areal density of HDDs, even though the width of a read head can be further reduced.

A recently developed technology that has further increased the areal density of magnetic HDDs is shingled magnetic recording (SMR). In an HDD that employs SMR, adjacent data tracks on a magnetic disk are each written so as to overlap, and therefore overwrite, a portion of the previously written data track. As a result, the data tracks written in an SMR HDD are compressed in width to allow for increased data density in an HDD.

However, SMR HDDs have a significant drawback. Once a data track is written in a shingled structure (sometimes also referred to as a "band" or "zone"), that data track cannot be updated in place as a random block write. This is because data in the adjacent and overlapping data tracks would be overwritten and either compromised or destroyed. Thus, random block writes within a band cannot be performed on shingled data tracks without disturbing existing data in adjacent tracks. As a result, to overwrite data within a group of SMR tracks making up a band, the entire group of SMR tracks must be rewritten as a new SMR band in the HDD, which can cause significant write amplification and reduce drive performance. For example, to update a few megabytes (MB) of data that are stored in a 100-MB SMR band, the entire SMR band must be read, updated with the new data, then rewritten as a new SMR band. Updating a small amount of new data in this way results in significant write amplification, since the operations performed by the SMR drive include: seeking to the start of the original 100-MB SMR band; reading all tracks of the original 100-MB SMR band; seeking to a new location, such as a spare SMR band; updating the read data with the small amount of new data; and writing the entire 100-MB SMR band at the new location. In such an example, there can be significant latency associated with such a process, even though a relatively small amount of new data is ultimately stored in the SMR HDD.

In part to avoid such write amplification and latency issues, SMR HDDs sometimes operate using a host-managed zone model. In a host-managed SMR HDD, the host avoids the use of random write commands to logical block addresses (LBAs) within a portion of an SMR band that already stores host data. Instead, host write commands are generally limited to writes at the LBA located at the end of the portion of the SMR band storing data. Thus, in host-managed SMR HDDs, new host data are added as sequential writes to an SMR band until that SMR band is filled, and data within the filled SMR band are not updated or invalidated by subsequent random write commands to LBAs within the filled SMR band. As a result, the caching of write command data associated with random LBAs within an SMR band and the subsequent rewriting of the SMR band to include such command data is avoided.

One drawback of host-managed SMR HDDs is that, under certain circumstances, high-latency events can occur during normal operation that adversely affect drive performance. For example, when a host-managed SMR HDD receives a write command from a host for an SMR band that is currently undergoing a refresh operation, the SMR HDD cannot complete the write command until the refresh operation has completed. Typically, a refresh operation for an SMR band is performed when the SMR band is determined to have been exposed to a certain quantity of adjacent write operations, and therefore can potentially begin to accrue data errors. A refresh operation involves "refreshing" the data stored by the SMR band by rewriting the data to a spare band, and can have a duration of as much as one or two seconds. Consequently, under such circumstances, a write command that may normally require a few milliseconds to implement cannot be completed by the SMR HDD for a drastically longer period.

In light of the above, there is a need in the art for more efficient handling of refresh operations in an SMR HDD.

SUMMARY

One or more embodiments described herein provide systems and methods for efficiently executing a write command in an SMR HDD. In some instances, a write command and associated write data are received by an SMR HDD from a host while the target SMR band for storing the write data is undergoing a refresh operation, during which data stored in the target SMR band are rewritten to a spare SMR band. According to various embodiments, in response to the write command, the HDD suspends the refresh operation, stores the write data in nonvolatile memory, and informs the host that the write command has been completed. After the write data are stored in nonvolatile memory, the HDD resumes the refresh operation, and the remaining unrefreshed data in the target SMR band are refreshed by being rewritten to the spare SMR band. The nonvolatile memory used to store the write data while the refresh operation is suspended can include the spare SMR band in some instances, the target SMR band in some instances, and in both the spare SMR band and the target SMR band in some instances. Additionally or alternatively, in some embodiments, the write data are stored in a protected solid-state memory location included in the HDD while the refresh operation is suspended.

A method of storing data in a magnetic disk drive with a shingled magnetic recording region (SMR) that includes a plurality of SMR bands, according to an embodiment, includes: starting a refresh operation for a first SMR band in the plurality of SMR bands, wherein the refresh operation includes reading host data from the first SMR band and writing the host data from the first SMR band to a second SMR band in the plurality of SMR bands; while performing the refresh operation, receiving a write command from a host that references a logical block address (LBA) range associated with the first SMR band and includes write data for the LBA range; in response to receiving the write command, suspending the refresh operation; while the refresh operation is suspended, storing the write data for the LBA range in at least one of the first SMR band and the second SMR band; and after storing the write data for the LBA range, resuming the refresh operation.

According to another embodiment, a magnetic disk drive comprises a controller and an SMR region that includes a plurality of SMR bands. The controller is configured to perform the steps of: starting a refresh operation for a first SMR band in the plurality of SMR bands, wherein the refresh operation includes reading host data from the first SMR band and writing the host data from the first SMR band to a second SMR band in the plurality of SMR bands; while performing the refresh operation, receiving a write command from a host that references a logical block address (LBA) range associated with the first SMR band and includes write data for the LBA range; in response to receiving the write command, suspending the refresh operation; while the refresh operation is suspended, storing the write data for the LBA range in at least one of the first SMR band and the second SMR band; and after storing the write data for the LBA range, resuming the refresh operation.

BRIEF DESCRIPTION OF THE DRAWINGS

So that the manner in which the above recited features of embodiments can be understood in detail, a more particular description of embodiments, briefly summarized above, may be had by reference to the appended drawings. It is to be noted, however, that the appended drawings illustrate only typical embodiments and are therefore not to be considered limiting of its scope, for the invention may admit to other equally effective embodiments.

FIG. 5 sets forth a flowchart of method steps for performing a refresh operation on an SMR band of an HDD, according to an embodiment.

FIG. 7 sets forth a flowchart of method steps for performing a refresh operation on an SMR band of an HDD, according to an embodiment.

FIG. 9 sets forth a flowchart of method steps for performing a refresh operation on an SMR band of an HDD, according to an embodiment.

FIG. 11 sets forth a flowchart of method steps for performing a refresh operation on an SMR band of an HDD, according to an embodiment.

FIGS. 12A-12C conceptually illustrate a target SMR band and a spare SMR band of an HDD at various times during the method steps of FIG. 11, according to various embodiments.

FIG. 13 sets forth a flowchart of method steps for performing a refresh operation on an SMR band of an HDD, according to an embodiment.

For clarity, identical reference numbers have been used, where applicable, to designate identical elements that are common between figures. It is contemplated that features of one embodiment may be incorporated in other embodiments without further recitation.

DETAILED DESCRIPTION

System Overview

Figure 1:
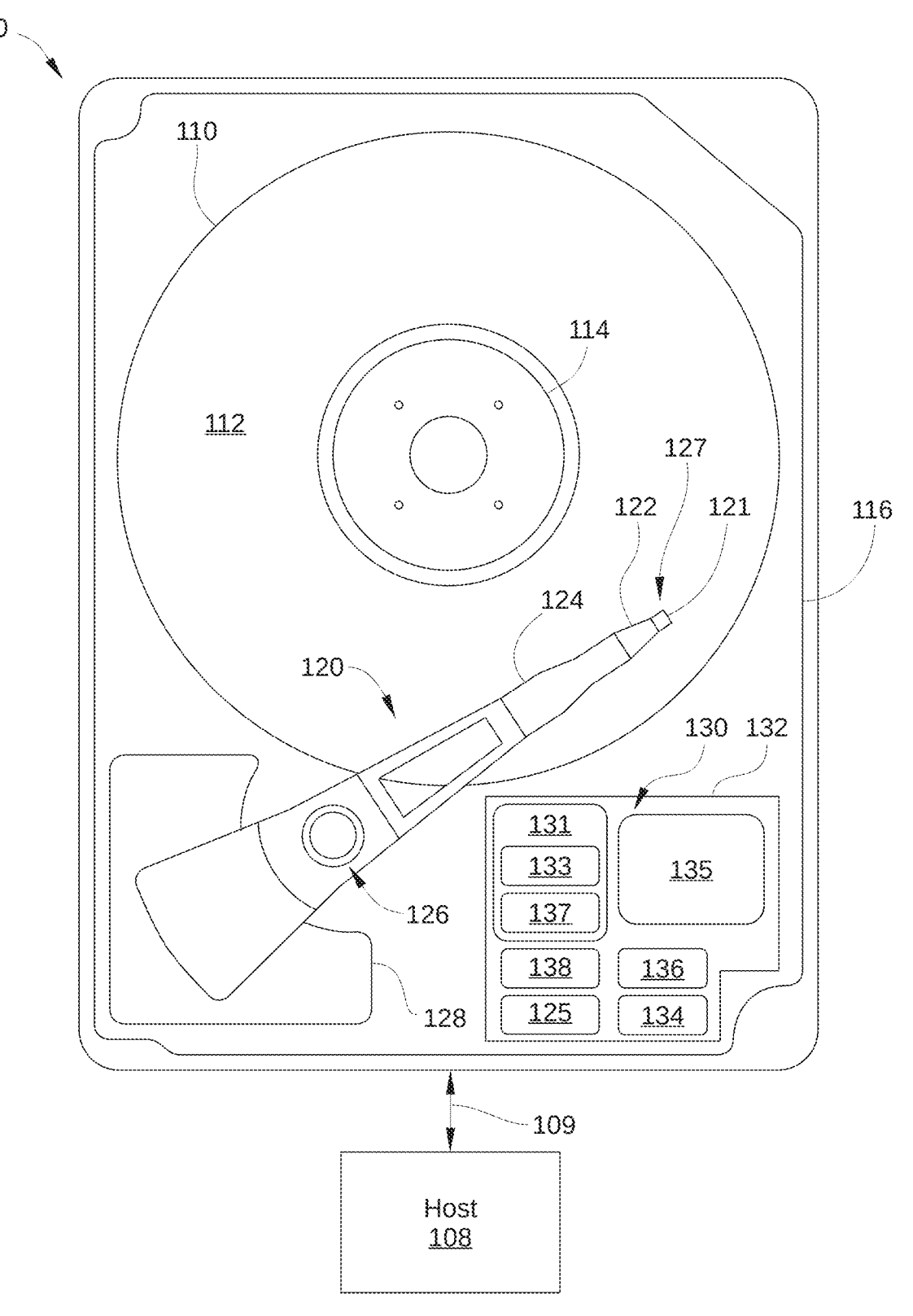
FIG. 1 is a schematic view of an exemplary hard disk drive (HDD), according to one embodiment.

FIG. 1 is a schematic view of an exemplary hard disk drive (HDD) 100, according to various embodiments. In the embodiment illustrated in FIG. 1, HDD 100 is connected to a host 108, such as a host computer, via a host interface 109, such as a serial advanced technology attachment (SATA) bus or a Serial Attached Small Computer System Interface (SAS) bus. In the embodiments, HDD 100 can be configured to operate as a host-managed shingled-magnetic recording (SMR) HDD. As such, HDD 100 receives host write commands from host 108 that are generally limited to sequential writes to each SMR band, where each write command begins at the logical block address (LBA) at the end of the most recently written LBA in that SMR band. Thus, new host data received by HDD 100 are transmitted by host 108 as sequential writes to a partially filled SMR band. As a result, data stored within an already filled portion of an SMR band are not updated or invalidated by host 108 with subsequent random write commands that reference LBAs within the already filled portion of the SMR band. Thus, when HDD 100 operates as a host-managed SMR HDD, the caching of new write command data associated with random LBAs and the subsequent sequential rewriting of the SMR band to include the cached new write command data is avoided.

For clarity, HDD 100 is illustrated without a top cover. HDD 100 includes multiple storage disks 110 (only one of which is visible in FIG. 1) that each include one or two recording surfaces 112 on which a plurality of concentric data storage tracks are disposed. In FIG. 1, only the top recording surface 112 of storage disk 110 is visible. The one or more storage disks 110 are coupled to and rotated by a spindle motor 114 that is mounted on a base plate 116. An actuator arm assembly 120 is also mounted on a base plate 116, and includes multiple sliders 121 (only one of which is visible in FIG. 1), each mounted on a flexure arm 122 with a magnetic read/write head 127 that reads data from and writes data to the data storage tracks of an associated recording surface 112. Each flexure arm 122 is attached to an actuator arm 124 that rotates about a bearing assembly 126 by a voice coil motor (VCM) 128. Thus, VCM 128 moves all of the multiple sliders 121 radially relative to a respective recording surface 112 of a storage disk 110, thereby positioning read/write head 127 over a desired concentric data storage track or a spiral track. Spindle motor 114, read/write head 127, and VCM 128 are coupled to electronic circuits 130, which are mounted on a printed circuit board 132. In some embodiments, each read/write head 127 has an associated additional actuator, such as a microactuator. The additional actuator (not shown in FIG. 1) could be on the suspension (i.e., flexure arm 122), at the gimbal between the suspension and slider 121, or on slider 121, and can move the associated read/write head 127 radially a small distance. Such actuators are generally referred to as dual-stage actuators, and enable the servo system of HDD 100 to attain more accurate tracking control.

In the embodiment illustrated in FIG. 1, a single actuator arm assembly 120 is shown that includes only one slider 121, one flexure arm 122, one actuator arm 124, and one read/write head 127. In other embodiments, actuator arm assembly 120 includes a plurality of actuator arms 124, sliders 121, flexure arms 122, and read/write heads 127, where each read/write head 127 is associated with a different recording surface 112 of HDD 100. Further, in some embodiments, HDD 100 can include multiple actuator arm assemblies 120 that are each rotated about bearing assembly 126 by a respective VCM 128 independently from each other. In such embodiments, each actuator arm assembly 120 may each include a plurality of actuator arms 123, sliders 121, flexure arms 122, and read/write heads 127.

Electronic circuits 130 include a read/write channel 137, a microprocessor-based controller 133, random-access memory (RAM) 134 (which may be a dynamic RAM and used as one or more data buffers) and/or a flash memory device 135, and, in some embodiments, a flash manager device 136. In some embodiments, read/write channel 137 and microprocessor-based controller 133 are included in a single chip, such as a system-on-chip 131. In some embodiments, HDD 100 further includes a motor-driver chip 125 that accepts commands from microprocessor-based controller 133 and drives both spindle motor 114 and VCM 128. Read/write channel 137 communicates with the read/write head 127 via a preamplifier (not shown) that may be mounted on a flex-cable that is itself mounted on either base plate 116, actuator arm 120, or both. In some embodiments, HDD 100 further includes a power loss protection system 138 that is configured to store certain data in a protected solid-state memory location included in HDD 100. One embodiment of power loss protection system 138 is described below in conjunction with FIG. 2.

Figure 2:
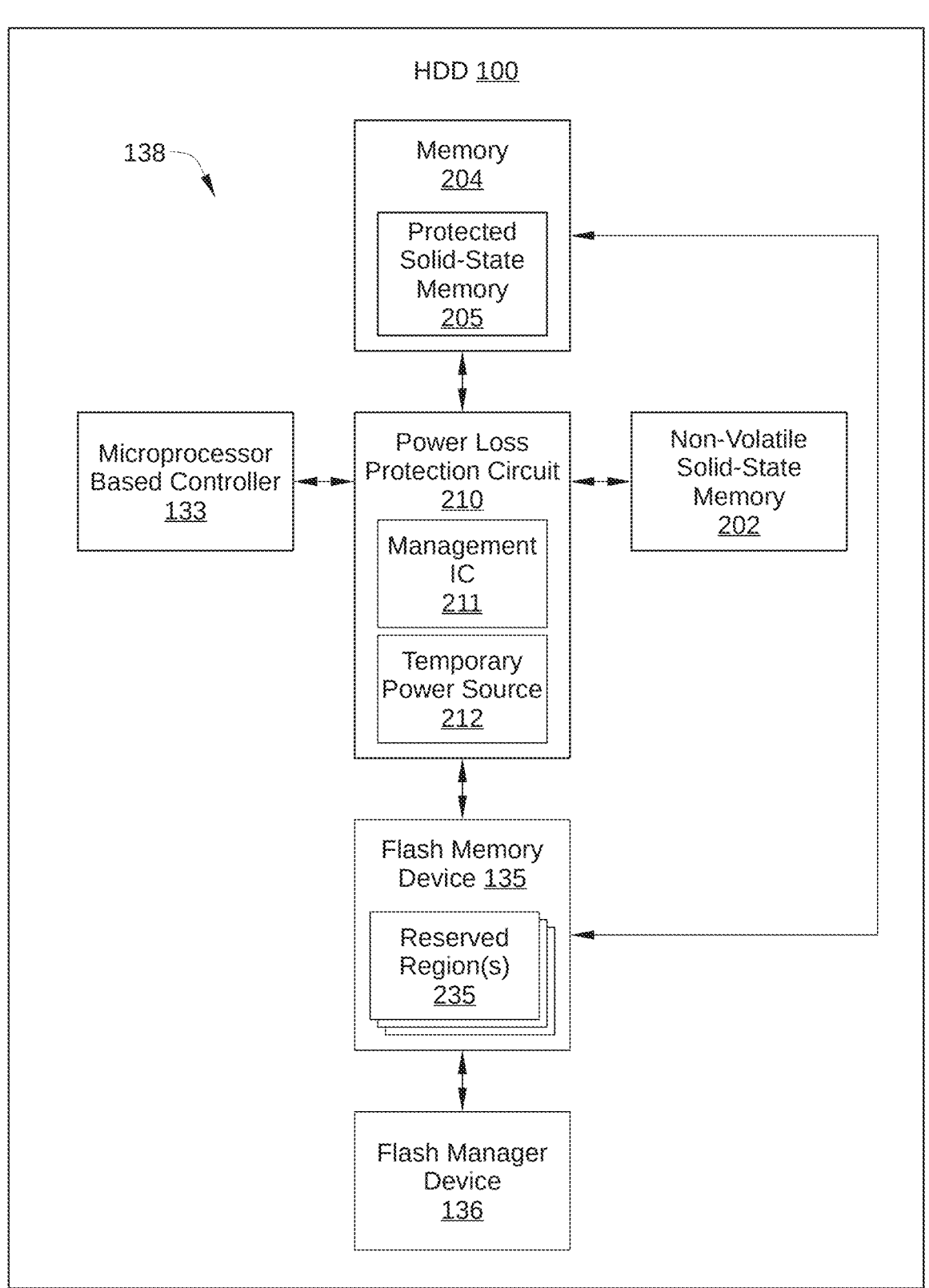
FIG. 2 is a schematic diagram of power loss protection system, according to various embodiments.

FIG. 2 is a schematic diagram of power loss protection (PLP) system 138, according to various embodiments. PLP system 138 prevents the loss of certain data stored in a memory 204 in the event of an unexpected loss of power to HDD 100 via a persistent-write cache that can store write data that have been received but not yet written to a storage disk 110 of HDD 100. In the embodiment shown in FIG. 2, PLP system 138 includes a PLP circuit 210 and memory 204, which are each communicatively coupled to microprocessor-based controller 133. In some embodiments, PLP circuit 210 and memory 204 are also communicatively coupled to flash memory device 135 and/or flash manager device 136. Alternatively or additionally, in some embodiments, PLP system 138 further includes non-volatile solid-state memory 202. In some embodiments, the persistent write cache can include one or more of non-volatile solid-state memory 202, protected solid-state memory 205 in memory 204, and reserved regions 235 in flash memory device 135.

Non-volatile solid-state memory 202 includes one or more solid-state memory devices or chips that can store data in a non-volatile fashion. Thus, data stored in non-volatile solid-state memory 202 are not lost when HDD 100 loses power or is powered off. In some embodiments, non-volatile solid-state memory 202 can include ferroelectric RAM (FeRAM, F-RAM or FRAM), which is a random-access memory similar in construction to DRAM that uses a ferroelectric layer instead of a dielectric layer to achieve non-volatility. In some embodiments, non-volatile solid-state memory 202 can include any other technically feasible non-volatile solid-state memory device or devices capable of storing data that can be erased and reprogrammed, such as electrically erasable programmable read-only memory (EE-PROM) devices.

Memory 204 includes one or more solid-state memory devices or chips, such as an array of volatile dynamic random-access memory (DRAM) chips. For example, in some embodiments, memory 204 includes a portion of RAM 134 shown in FIG. 1. In the embodiment illustrated in FIG. 2, memory 204 also includes a protected solid-state memory 205. In some embodiments, in the event of unexpected power loss, PLP circuit 210 causes data in protected solid-state memory 205 to be stored in one or more reserved regions 235 in flash memory device 135 or non-volatile solid-state memory 202. Even though protected solid-state memory 205 may be comprised entirely of volatile RAM, such as dynamic RAM, protected solid-state memory 205 can be considered nonvolatile because memory 204, micro-processor-based controller 133, flash memory device 135, and flash manager device 136 are all coupled to PLP circuit 210. Consequently, upon detection of power loss to HDD 100, data stored in protected solid-state memory 205 can be stored in one or more reserved regions 235 in flash memory device 135, and such data are not lost despite the loss of power to HDD 100.

In some embodiments, protected solid-state memory 205 includes specific memory locations in memory 204 that are automatically stored to non-volatile memory (e.g., flash memory device 135 and/or non-volatile solid-state memory 202) in response to a power loss event. Alternatively or additionally, in some embodiments, protected solid-state memory 205 includes normal memory locations in memory 204 that are volatile. In such embodiments, such normal memory locations in memory 204 operate as protected solid-state memory 205 when added to a list of protected memory locations that are automatically stored to non-volatile memory in response to a power loss event.

PLP circuit 210 is configured to power memory 204, microprocessor-based controller 133, flash memory device 135, flash manager device 136, and/or non-volatile solid-state memory 202 for a short but known time interval. Thus, in the event of unexpected power loss, PLP circuit 210 allows data stored in protected solid-state memory 205 to be copied to the one or more reserved regions 235 of flash memory device 135 and/or to non-volatile solid-state memory 202. In normal operation, memory 204 is employed as a smaller, but much faster storage device than flash memory device 135, since DRAM write operations are typically performed orders of magnitude faster than NAND write operations. Consequently, data received by HDD 100 from a host can be initially stored in memory 204 rather than in flash memory device 135. PLP circuit 210 allows some or all of memory 204 to temporarily function as non-volatile memory, and data stored therein will not be lost in the event of unexpected power loss to data storage system 100. As shown, PLP circuit 210 includes a management integrated circuit (IC) 211 and a temporary power source 212.

Management IC 211 is configured to monitor an external power source (not shown) and temporary power source 212, and to alert microprocessor-based controller 133 of the status of each. Management IC 211 is configured to detect interruption of power from the external power source, to alert microprocessor-based controller 133 of the interruption of power, and to switch temporary power source 212 from an "accept power" mode to a "provide power" mode. Thus, when an interruption of power from the external power source is detected, HDD 100 can continue to operate for a finite time, for example a few seconds or minutes, depending on the charge capacity of temporary power source 212. During such a time, microprocessor-based controller 133 can copy data stored in memory 204 (for example in protected solid-state memory 205) to reserved regions 235 of flash memory device 135 and/or in non-volatile solid-state memory 202. In some embodiments, upon power restoration from the external power source, management IC 211 is further configured to copy data stored in reserved regions 235 or in non-volatile solid-state memory 202 back to memory 204.

Temporary power source 212 may be any technically feasible device capable of providing electrical power to memory 204, microprocessor-based controller 133, flash memory device 135, flash manager device 136, and/or non-volatile solid-state memory 202 for a finite period of time, as described above. Suitable devices includes rechargeable batteries, dielectric capacitors, and electro-chemical capacitors (also referred to as "supercapacitors"). Alternatively or additionally, in some embodiments, temporary power source 212 includes spindle motor 114 (shown in FIG. 1), where spindle motor 114 temporarily acts as a generator that uses rotational inertia of storage disks 110 in the case of unexpected power loss.

Returning to FIG. 1, when data are transferred to or from a particular storage disk 110 of HDD 100, actuator arm assembly 120 moves in an arc between the inner diameter (ID) and the outer diameter (OD) of a particular storage disk 110. Actuator arm assembly 120 accelerates in one angular direction when current is passed in one direction through the voice coil of VCM 128 and accelerates in an opposite direction when such current is reversed, thereby allowing control of the position of actuator arm assembly 120 and the attached read/write head 127 with respect to the particular storage disk 110. VCM 128 is coupled with a servo system that uses the positioning data read from servo wedges on storage disk 110 by read/write head 127 to determine the position of read/write head 127 over a specific data storage track. For example, the servo system may position read/write head 127 over recording surface 112 based on positioning data read from recording surface 112.

In positioning a read/write head 127 over a recording surface 112, the servo system determines an appropriate current to drive through the voice coil of VCM 128, and drives said current using a current driver and associated circuitry. Typically, the appropriate current is determined based in part on a position feedback signal of the read/write head 127, such as a position error signal (PES). The PES is typically generated by using servo patterns included in the servo wedges (not shown) on the recording surface 112 as a reference. One embodiment of a recording surface 112 is illustrated in FIG. 3.

Figure 3:
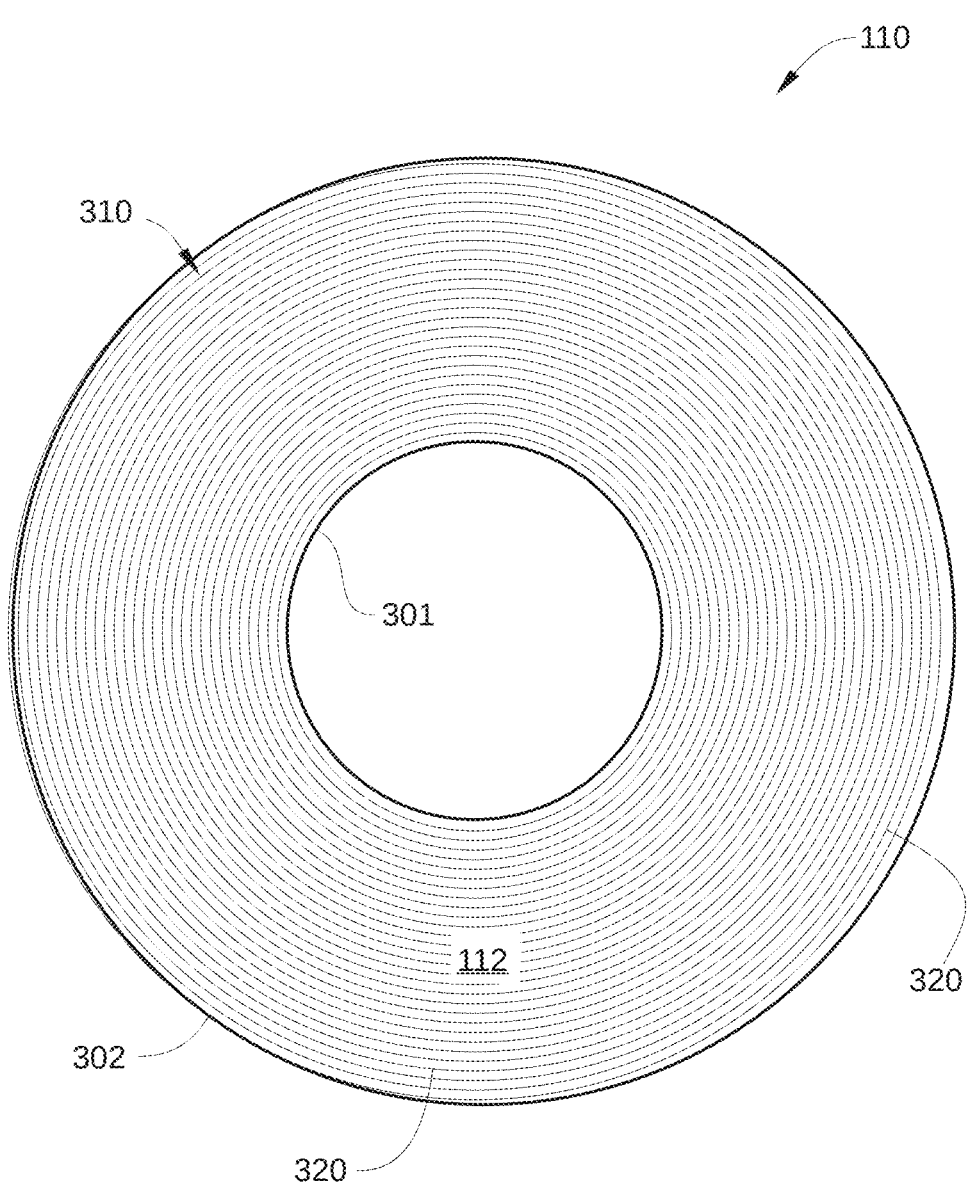
FIG. 3 schematically illustrates a recording surface of a storage disk with concentric data storage tracks formed thereon, according to an embodiment.

FIG. 3 schematically illustrates a recording surface 112 of a storage disk 110 with concentric data storage tracks 320 formed thereon, according to an embodiment. Data storage tracks 320 are formed on recording surface 112 between an ID 301 and an OD 302 of storage disk 110. Data storage tracks 320 are configured for storing data, and the radial position and track pitch, i.e., spacing, of data storage tracks 320 is defined by servo sectors (not shown) formed on recording surface 112. Each servo sector contains a reference signal that is read by read/write head 127 during read and write operations to position read/write head 127 above a desired data storage track 320. Typically, the actual number of data storage tracks 320 included on recording surface 112 is considerably larger than illustrated in FIG. 3. For example, recording surface 112 may include hundreds of thousands of concentric data storage tracks 320. The majority of data storage tracks 320 are disposed in a user region 310 of recording surface 112, while the remainder of data storage tracks 320 are disposed in a system area (not shown) for storage of drive-related data, such as code for HDD 100, data layout information, servo-control parameters, and/or the like.

Generally, user region 310 includes the majority of the storage capacity of recording surface 112. User region 310 is a shingled magnetic recording (SMR) region of recording surface 112 that includes data storage tracks 320 that are arranged in groups, or "bands," of data storage tracks. Each band of data storage tracks is typically separated from adjacent bands by guard regions, which are inter-band gaps in which no data tracks are formed. Further, the data storage tracks formed in user region 310 are written in an SMR format, and therefore overlap adjacent data tracks in the same band. Thus, each band in user region 310 includes a plurality of overlapping data tracks that each have a width that is significantly narrower than a width of the write element included in read/write head 127. One embodiment of such a band is illustrated in FIG. 4.

Figure 4:
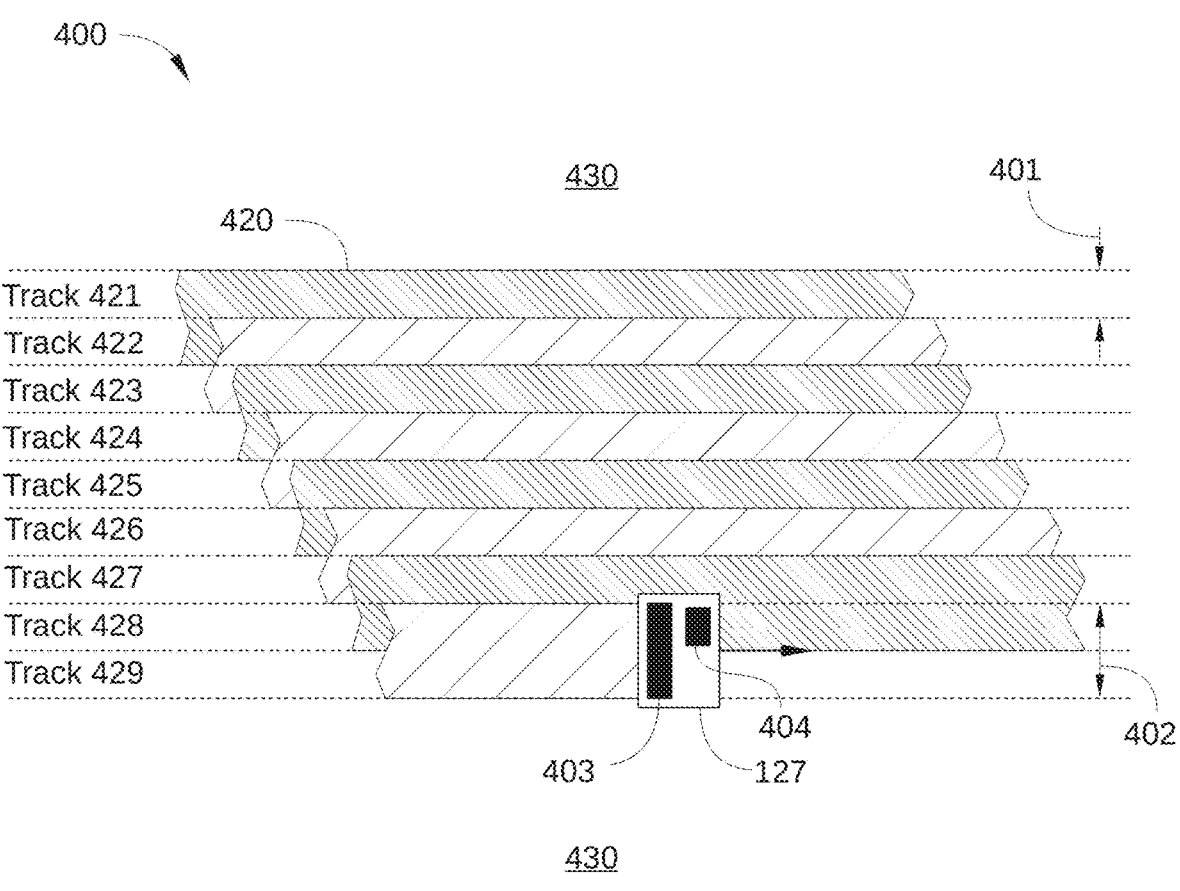
FIG. 4 is a schematic illustration of a portion of a recording surface indicated in FIG. 3 that includes a band of shingled magnetic recording (SMR) data tracks, according to an embodiment.

FIG. 4 is a schematic illustration of a portion 400 of recording surface 112 in FIG. 3 that includes a band 420 of SMR data tracks, according to an embodiment. Band 420 includes a plurality of SMR data tracks 421-429, and is separated from adjacent bands (not shown) by guard regions 430. As shown, each of SMR data tracks 421-429 overlaps and/or is overlapped by at least one adjacent SMR data track. As a result, each of SMR data tracks 421-429 has a readable width 401 that is significantly less than an as-written width 402. In FIG. 4, data has been written to SMR data tracks 421-427 and is in the process of being written to SMR data tracks 428 and 429. Due to the nature of SMR data tracks, the data shown being written to SMR data track 428 in FIG. 4 will be overwritten subsequently by data associated with SMR data track 429. It is noted that in the embodiment illustrated in FIG. 4, band 420 only includes nine SMR data tracks, whereas in practice band 420 may include up to one hundred or more SMR data tracks.

Also shown in FIG. 4 is read/write head 127, which is configured with a write head 403 and a read head 404 that are each designed for SMR. As such, read head 404 is configured with a width that is approximately equal to or less than readable width 401, and is positioned within read/write head 127 to facilitate reading of SMR data tracks 421-429. Furthermore, write head 403 is positioned within read/write head 127 to facilitate writing of SMR data tracks 421-429 with as-written width 402. In accordance with the principle of SMR, as-written width 402 exceeds readable width 401, for example by a factor of as much as 1.1 to 2.0. Thus, as a particular one of SMR data tracks 421-429 is written, write head 403 is positioned to overlap a significant portion of the next SMR data track.

Suspension of Refresh Operation in SMR HDD

FIG. 5 sets forth a flowchart of method steps for performing a refresh operation on an SMR band of HDD 100, according to an embodiment. Although the method steps are described in conjunction with HDD 100 of FIGS. 1-4, persons skilled in the art will understand that the method steps may be performed with other types of systems. The control algorithms for the method steps reside in a suitable controller, such as microprocessor-based controller 133 and/or PLP system 138. Such control algorithms may reside in whole or in part as software- or firmware-implemented logic, and/or as hardware-implemented logic circuits.

As shown, a method 500 begins at step 501, when a suitable controller associated with HDD 100 determines that a refresh operation is required for a specified SMR band 420 of HDD 100. In some embodiments, a particular SMR band 420 is determined to require a refresh when a threshold number of write operations is performed in proximity to that particular SMR band 420, such as in an adjacent SMR band. Alternatively or additionally, in some embodiments, a particular SMR band 420 is determined to require a refresh when a rate of read-back errors associated with that particular SMR band 420 meets or exceeds a threshold value.

In step 502, the controller begins performing a refresh operation on the SMR band 420 determined in step 501, referred to herein as the "target SMR band." In the refresh operation, data stored in the target SMR band is read and then rewritten to a spare SMR band of HDD 100, then the spare SMR band replaces the target SMR band as the storage location of the data stored in the target SMR band. In some embodiments, the refresh operation includes a plurality of flush operations. In such embodiments, in each flush operation a portion of the data stored in the target SMR band is read and then written to the spare SMR band, where each flush operation is associated with a different portion of the data stored in the target SMR band. In such embodiments, after each flush operation is completed, a current value of a flush-extent LBA is determined that indicates which LBAs of the target SMR band have been replicated with freshly written data in the spare SMR band. Thus, as each flush operation is completed, the value of the flush-extent LBA is indexed to an LBA that is located closer to the end of the target SMR band. In some embodiments, a refresh operation can include up to five, ten, or more flush operations.

In step 503, HDD 100 receives a write command, for example from host 108. Generally, the write command includes write data and an LBA range within the target SMR band in which the write data are to be stored by HDD 100. It is noted that most write commands received by HDD 100 from host 108 are for storage of write data to a different SMR band than the target SMR band. However, in step 503, the write command received by HDD 100 references an LBA range that is within the target SMR band, which is an SMR band of HDD 100 that is currently undergoing a refresh operation.

In step 504, the controller suspends the refresh operation that is currently being performed on the target SMR band, where the suspension of the refresh operation is performed in response to receipt of the write command in step 503. In some embodiments, suspension of the refresh operation includes the completion of the current flush operation. Thus, in such embodiments, the reading of a particular portion of data from the target SMR band, the writing of this data to the spare SMR band, and the updating of the value of the flush-extent LBA are all completed before the refresh operation is temporarily halted.

In step 505, the controller determines the position of the LBA range referenced by the write command relative to the current value of the flush-extent LBA. In some embodiments, the controller determines which of three different positions the LBA range referenced by the write command has relative to the current value of the flush-extent LBA. In a first position, the LBA range referenced by the write command spans a portion of the LBA space of the target SMR band that is prior to the current value of the flush-extent LBA. One instance of the first position is described below in conjunction with FIG. 6A. In a second position, the LBA range referenced by the write command spans a portion of the LBA space of the target SMR band that is after the current value of the flush-extent LBA. One instance of the second position is described below in conjunction with FIG. 6B. In a third position, the LBA range referenced by the write command spans a first portion of the LBA space of the target SMR band that is prior to the current value of the flush-extent LBA and a second portion of the LBA space of the target SMR band that is after the current value of the flush-extent LBA. One instance of the third position is described below in conjunction with FIG. 6C.

Figure 6A:
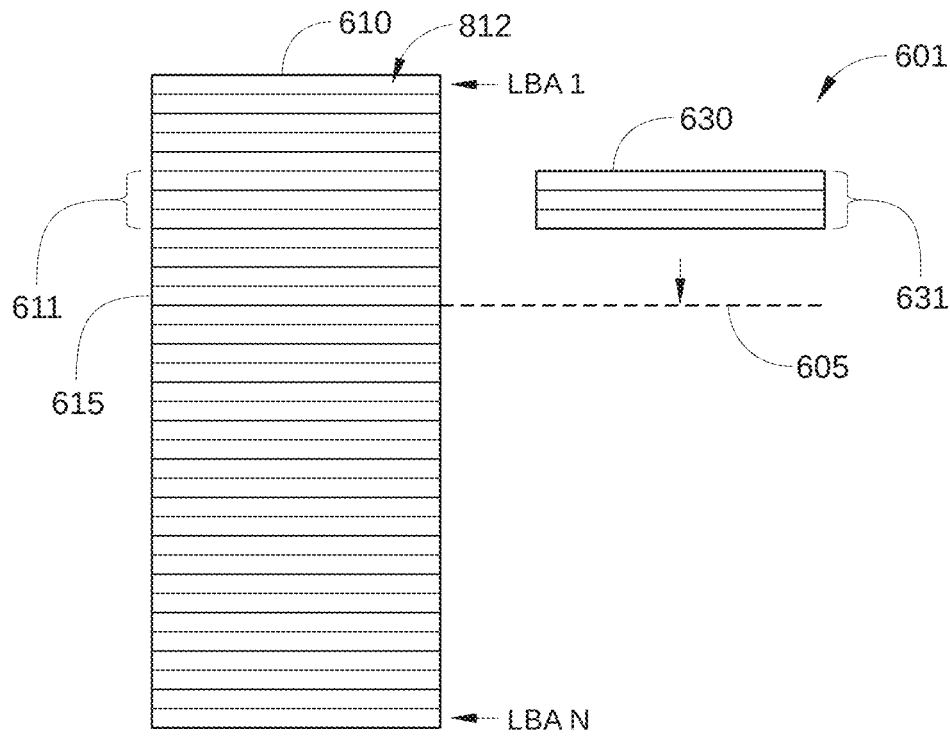
FIG. 6A conceptually illustrates a first position of a logical block address (LBA) range that is referenced by a write command, according to various embodiments.

FIG. 6A conceptually illustrates a first position 601 of an LBA range 631 that is referenced by a write command 630, according to various embodiments. First position 601 spans a portion 611 of an LBA space of a target SMR band 610, such as an SMR band that is currently undergoing a refresh operation. In the embodiment illustrated in FIG. 6A, the LBA space of target SMR band 610 includes a total of N LBAs and spans a range of LBAs from LBA 1 to LBA N. In some embodiments, N can be a value on the order of tens of thousands, where each LBA corresponds to a different sector of a data storage track. Generally, host data (not shown) are written sequentially to target SMR band 610 starting at LBA 1 and ending at LBA N. Similarly, in a refresh operation, data are read sequentially from target SMR band 610 starting at LBA 1 and ending at LBA N.

In the instance shown in FIG. 6A, portion 611 is located prior to the current value of a flush-extent LBA 605, where flush-extend LBA 605 indicates the last LBA 615 that has been rewritten to a spare SMR band (not shown) during the refresh operation. As shown, in first position 601, LBA range 631 does not extend past the current value of flush-extent LBA 605, and consequently references LBAs that have already been written to the spare SMR band in the refresh operation being performed on target SMR band 610.

Figure 6B:
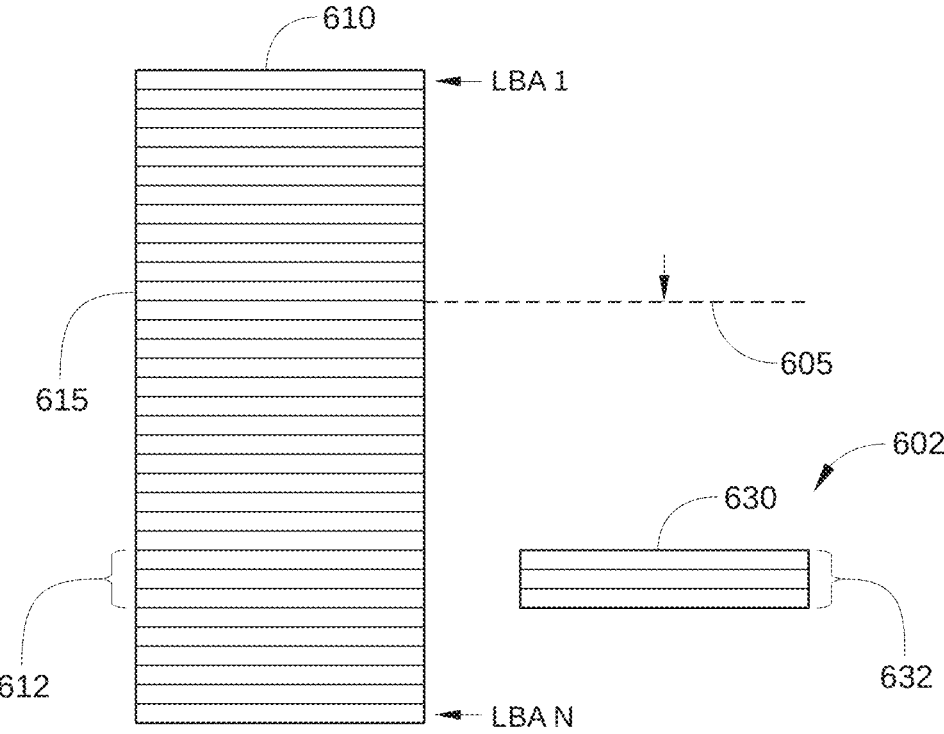
FIG. 6B conceptually illustrates a second position of an LBA range that is referenced by a write command, according to various embodiments.

FIG. 6B conceptually illustrates a second position 602 of an LBA range 632 that is referenced by write command 630, according to various embodiments. Second position 602 spans a portion 612 of the LBA space of target SMR band 610. As shown, portion 612 is located after the current value of flush-extent LBA 605. Thus, in second position 602, LBA range 632 does not extend before the current value of flush-extent LBA 605, and consequently references LBAs of target SMR band 610 that have not yet been written to the spare SMR band in the refresh operation.

Figure 6C:
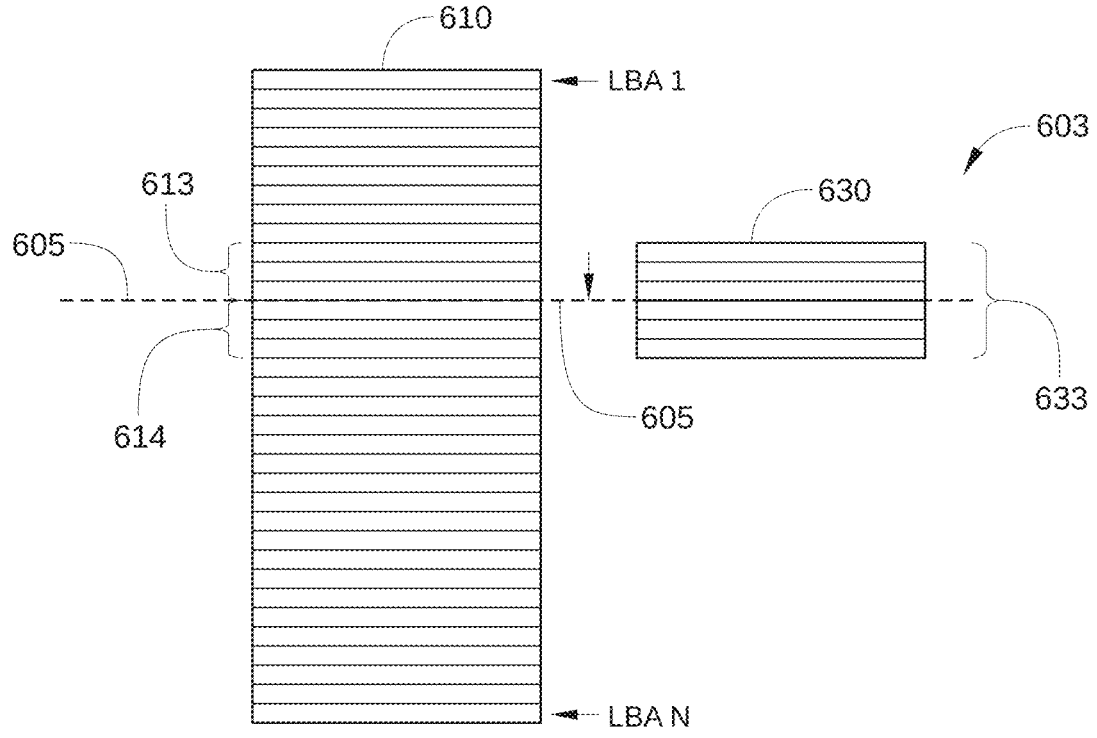
FIG. 6C conceptually illustrates a third position of an LBA range that is referenced by a write command, according to various embodiments.

FIG. 6C conceptually illustrates a third position 603 of an LBA range 633 that is referenced by write command 630, according to various embodiments. In third position 603, LBA range 633 of write command 630 spans a first portion 613 and a second portion 614 of the LBA space of target SMR band 610. As shown, first portion 613 is located before the current value of flush-extent LBA 605 and second portion 614 is located after the current value of flush-extent LBA 605. Thus, in the third position, the LBA range referenced by write command 63 spans LBAs located before, after, and including flush-extent LBA 605.

Returning to FIG. 5, in step 506, the controller stores the write data included in the write command that was received in step 503 (such as write command 630 in FIG. 6A, 6B, or 6C). In some embodiments, the controller stores the write data in a different location within HDD 100 based on whether the LBA range of the write command references the first position of FIG. 6A, the second position of FIG. 6B, or the third position of FIG. 6C. In such embodiments, when the controller determines the LBA range of the write command references the first position of FIG. 6A, the controller stores the write data as described below in conjunction with FIGS. 7 and 8A-8D; when the controller determines the LBA range of the write command references the second position of FIG. 6B, the controller stores the write data as described below in conjunction with FIGS. 9 and 10A-10D; and when the controller determines the LBA range of the write command references the third position of FIG. 6C, the controller stores the write data as described below in conjunction with FIGS. 11 and 12A-12C or with FIGS. 13 and 14A-14D.

Alternatively or additionally, in some embodiments, in step 506, the controller stores the write data included in the write command in a protected solid-state memory location within HDD 100, such as a reserved region 235 of flash memory device 135, protected solid-state memory 205, and/or non-volatile solid-state memory 202. Thus, in such embodiments, while suspending the refresh operation, the controller can quickly store the write data included in the write command in a non-volatile or effectively non-volatile location.

In some embodiments, in step 507, the controller transmits a message to host 108 indicating that the write command received in step 503 has been completed. For example, in embodiments in which HDD 100 includes a persistent write cache, power loss that occurs after step 506 but before the completion of the refresh operation of method 500 does not result in the loss of the write data written to the spare SMR band. Thus, the controller can transmit the message to host 108 indicating that the write command received in step 503 has been completed without violating data security. Alternatively or additionally, in embodiments in which write-command caching in HDD 100 is enabled, in step 507 the controller transmits the message to host 108 indicating that the write command received in step 503 has been completed. Because write caching is enabled, host 108 is aware of the possibility that the write data of write commands that are recently indicated by HDD 100 to be completed may still be vulnerable to power loss. In embodiments in which HDD 100 does not include a persistent write cache and for which write caching is disabled, the controller generally does not transmit a message to host 108 indicating that the write command received in step 503 has been completed until after completion of method 500.

In step 508, the controller causes the refresh operation to be resumed. In some embodiments, the LBA location at which the refresh operation is resumed is based on whether the LBA range of the write command references the first position of FIG. 6A, the second position of FIG. 6B, or the third position of FIG. 6C. In such embodiments, when the controller determines the LBA range of the write command indicates the first position of FIG. 6A, the controller resumes the refresh operation as described below in conjunction with FIGS. 7 and 8A-8D; when the controller determines the LBA range of the write command indicates the second position of FIG. 6B, the controller resumes the refresh operation as described below in conjunction with FIGS. 9 and 10A-10D; and when the controller determines the LBA range of the write command indicates the third position of FIG. 6C, the controller resumes the refresh operation as described below in conjunction with FIGS. 11 and 12A-12C or with FIGS. 13 and 14A-14D.

In step 509, the controller causes the refresh operation to be completed, so that the data stored in the target SMR band is rewritten to the spare SMR band. Upon completion of the refresh operation, the spare SMR band replaces the target SMR band as the storage location of the data stored in the target SMR band and of the new write data received in step 503.

Handling Write Command when Write Command is in First Position

FIG. 7 sets forth a flowchart of method steps for performing a refresh operation on an SMR band of HDD 100, according to an embodiment. In some embodiments, some of the methods steps can be consistent with or performed in lieu of steps 505-509 of FIG. 5. FIGS. 8A-8D conceptually illustrate a target SMR band 810 and a spare SMR band 820 of HDD 100 at various times during the method steps, according to various embodiments.

Although the method steps are described in conjunction with HDD 100 of FIGS. 1-6C, persons skilled in the art will understand that the method steps may be performed with other types of systems. The control algorithms for the method steps reside in a suitable controller, such as microprocessor-based controller 133 and/or PLP system 138. Such control algorithms may reside in whole or in part as software- or firmware-implemented logic, and/or as hardware-implemented logic circuits.

Prior to the method steps, a refresh operation is begun on a target SMR band 810. For example, in some embodiments, the controller may determine that the refresh operation is required for target SMR band 810 in a fashion consistent with step 501 of FIG. 5.

Figure 8A:
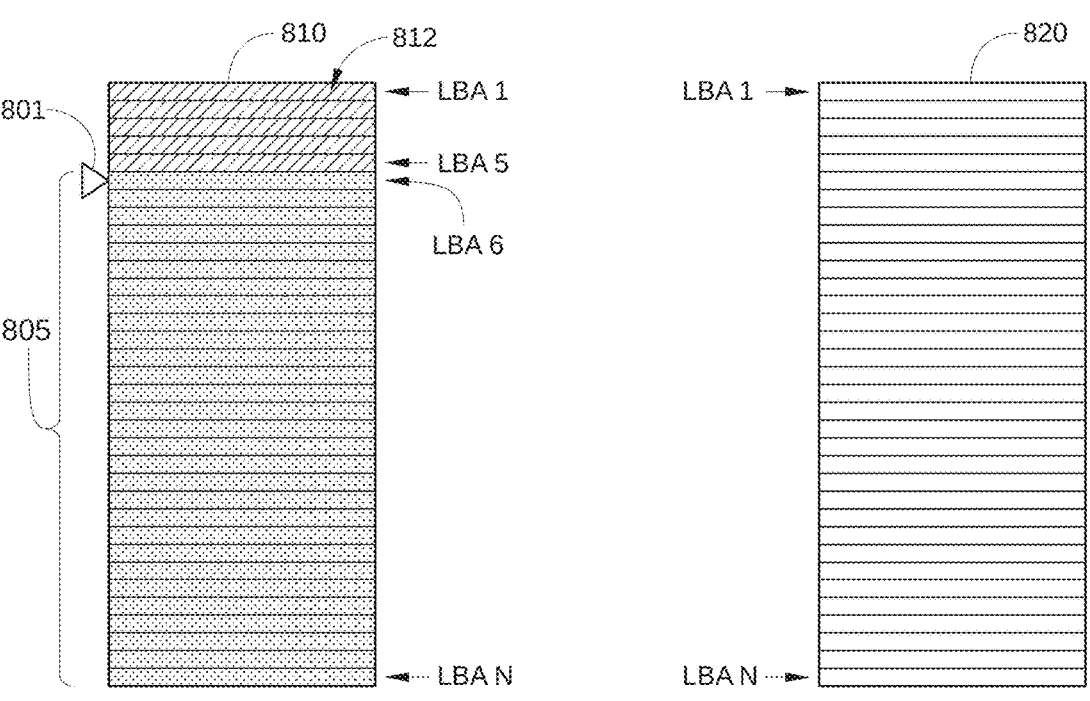
FIGS. 8A-8D conceptually illustrate a target SMR band and a spare SMR band of an HDD at various times during the method steps of FIG. 7, according to various embodiments.

FIG. 8A conceptually illustrates target SMR band 810 juxtaposed with a spare SMR band 820 prior to the refresh operation being performed on target SMR band 810, according to an embodiment. Generally, spare SMR band 820 is an SMR band that is disposed on the same recording surface of HDD 100. Further, in some embodiments, spare SMR band 820 is an SMR band that is disposed proximate target SMR band 810 and/or in the same recording zone of the recording surface as target SMR band 810. Target SMR band 810 includes an LBA space that has a total of N LBAs and spans a range of LBAs from LBA 1 to LBA N. As shown, target SMR band 810 includes host data 812 that have been written sequentially to target SMR band 810, starting at LBA 1 and ending at LBA 5. Because HDD 100 operates as a host-managed SMR drive, the next LBA of target SMR band 810 to receive host data is LBA 6, which is indicated by a write pointer 801 associated with target SMR band 810. In some embodiments, a remainder portion 805 of target SMR band 810 includes the LBAs of target SMR band 810 that currently do not store host data 812. In the embodiment illustrated in FIG. 8A, remainder portion 805 begins at the LBA indicated by write pointer 801 and ends at the last LBA of target SMR band 810, such as LBA N. In some embodiments, remainder portion 805 of target SMR band 810 stores dummy data, such as a set of artificially created data that is not intended to be read by HDD 100 but can prevent read errors from occurring during operation of HDD 100. In such embodiments, the dummy data can include a series of repeating magnetic transitions or a pattern of magnetic transitions, such as alternating 1s and 0s, all 1s, all 0s, and the like.

Prior to the refresh operation being performed on target SMR band 810, spare SMR band 820 stores no host data 812. In some embodiments, the LBAs of spare SMR band 820 instead store dummy data (not shown for clarity) similar to that stored in remainder portion 805 of target SMR band 810. Spare SMR band 820 can be any available spare band of HDD 100. In some embodiments, spare SMR band 820 is disposed on the same recording surface as target band 810, such as recording surface 112 in FIG. 1.

Figure 8B:
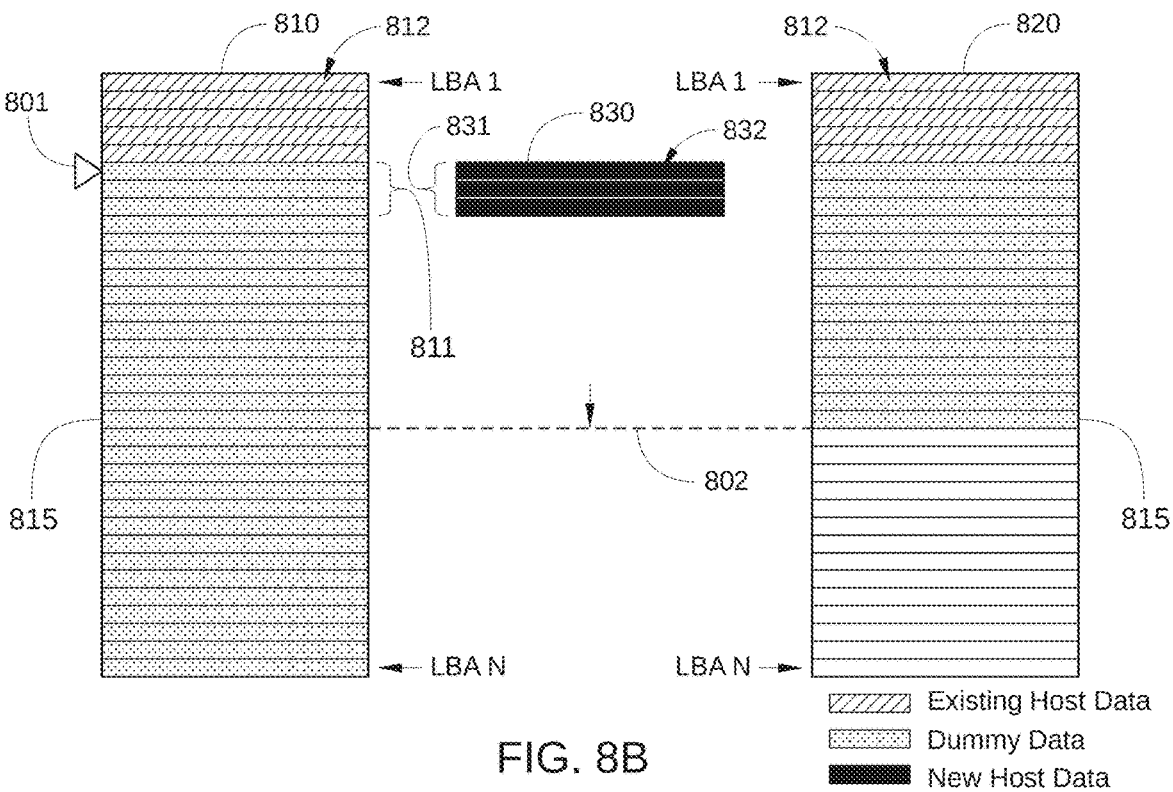

FIG. 8B conceptually illustrates target SMR band 810 and spare SMR band 820 after the refresh operation being performed on target SMR band 810 has begun and HDD 100 has received a write command 830 that includes write data and an LBA range 831 within target SMR band 810, according to an embodiment. In some embodiments, HDD 100 receives write command 830 in a fashion consistent with step 503 of FIG. 5. In the embodiment illustrated in FIG. 8B, the refresh operation has been completed up to a flush-extent LBA 802, where flush-extent LBA 802 indicates the last LBA 815 that has been written to spare SMR band 820 during the refresh operation. As shown, as a result of the refresh operation, spare SMR band 820 stores a copy of host data 812. In addition, a portion of spare SMR band 820 between write pointer 801 and flush-extent LBA 802 stores newly written dummy data. In the embodiment illustrated in FIG. 8B, write command 830 includes new host data (write data 832) that is to be stored in LBA range 831. As shown, LBA range 831 referenced by write command 830 spans a portion 811 of the LBA space of target SMR band 810 that is prior to the current value of flush-extent LBA 802.

Returning to FIG. 7, a method 700 begins at step 701, when a suitable controller associated with HDD 100 determines that LBA range 831 referenced by write command 830 spans a portion of the LBA space of target SMR band 810 that is prior to the current value of flush-extent LBA 802. Thus, LBA range 831 referenced by write command 830 has a first position as described above in conjunction with FIG. 6A. In some embodiments, the controller determines that LBA range 831 has a first position relative to the current value of flush-extent LBA 802 in a fashion consistent with step 505 of FIG. 5.

Figure 8C:
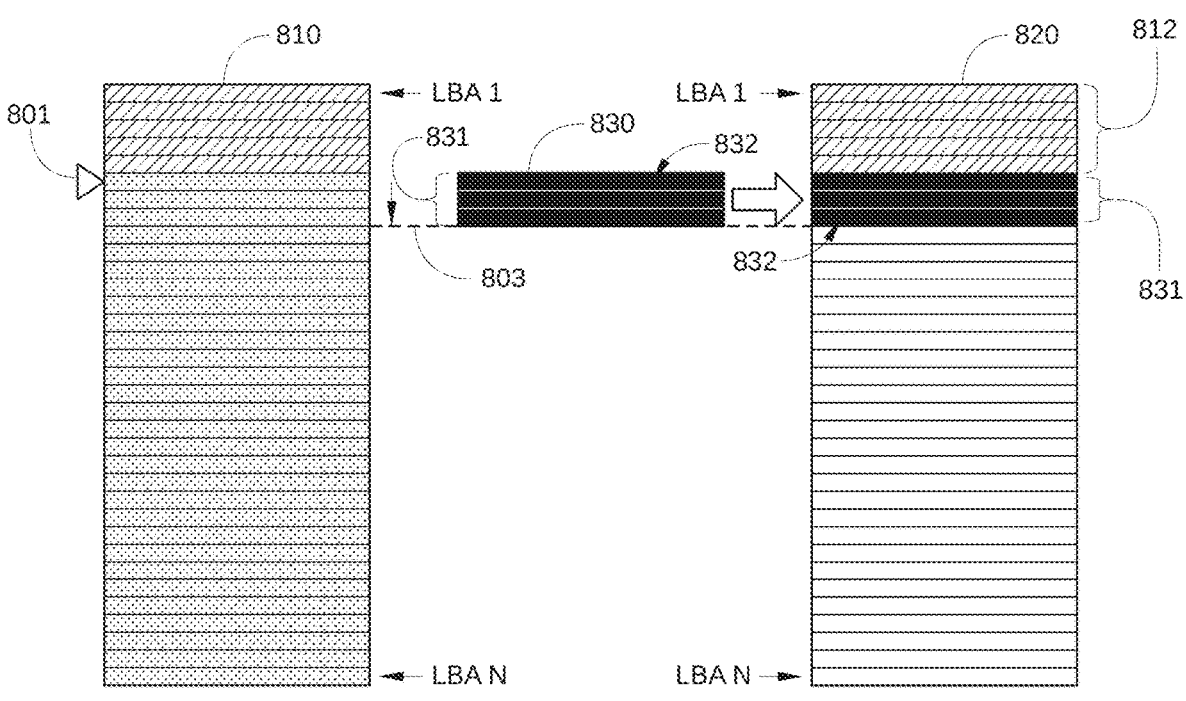

In step 702, the controller stores write data 832 in LBA range 831 of spare SMR band 830, as shown in FIG. 8C. FIG. 8C conceptually illustrates target SMR band 810 and spare SMR band 820 after HDD 100 stores write data 832 in LBA range 831 within spare SMR band 820, according to an embodiment.

In step 703, in some embodiments the controller transmits a message to host 108 indicating that write command 830 has been completed. Thus, HDD 100 notifies host 108 that write data 832 is stored in a nonvolatile location and cannot be lost due to unexpected power loss to HDD 100. In embodiments in which HDD 100 does not include a persistent write cache and for which write caching is disabled, the controller generally does not transmit a message to host 108 indicating that write command 830 has been completed until after completion of method 700.

In step 704, the controller resets flush-extent LBA 802 to the end of LBA range 831, as shown in FIG. 8C. In FIG. 8C, flush-extent LBA 802 is changed to reset flush-extent LBA 803, which indicates the last LBA of LBA range 831. As a result, when the refresh operation on target SMR band 831 resumes, data from target SMR band 831 are copied to spare SMR band 820 starting at reset flush-extent LBA 803. It is noted that, in some embodiments, upon completion of step 704, write pointer 801 for target SMR band 810 is not repositioned. Consequently, if there is unexpected power loss to HDD 100 before completion of the refresh operation, target SMR band 810 has not been modified and can be used normally by storing new host data at the LBA indicated by write pointer 801.

Figure 8D:
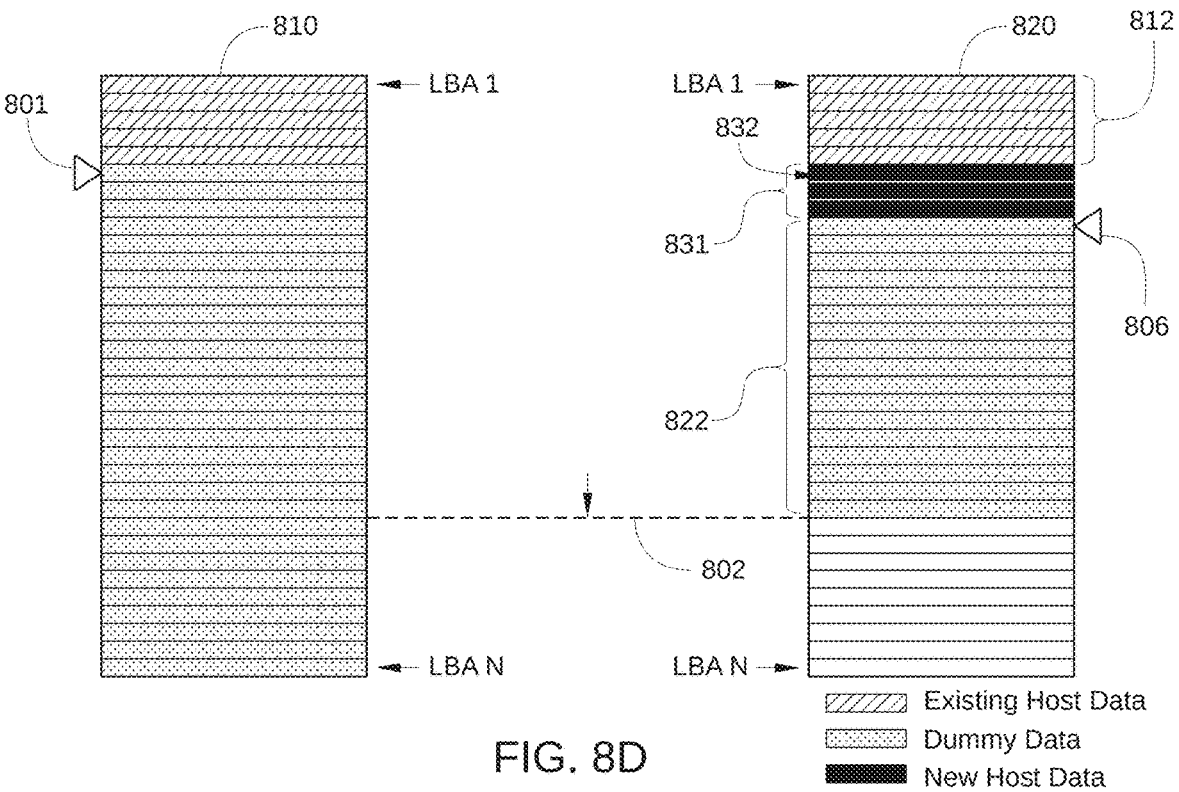

In step 705, the controller resumes the refresh operation starting at reset flush-extent LBA 803, as shown in FIG. 8D.

FIG. 8D conceptually illustrates target SMR band 810 and spare SMR band 820 after HDD 100 has resumed the refresh operation on target SMR band 810, according to an embodiment. As shown, most but not all of the data stored in target SMR band 810 is copied to spare band 820, as indicated by the position of flush-extent LBA 802. Write data 832 are stored in LBA range 831 of spare SMR band 820 and dummy data are stored in a remainder portion 822 of spare SMR band 820. In some embodiments, a new write pointer location 806 is also generated as part of the refresh operation. In such embodiments, when spare SMR band 820 replaces target SMR band 810, the next LBA of spare SMR band 820 to receive host data is indicated by new write pointer location 806. In step 706, the controller completes the refresh operation, and spare SMR band 820 replaces target SMR band 810 as the storage location of host data 812 and write data 832.

Handling Write Command when Write Command is in Second Position

FIG. 9 sets forth a flowchart of method steps for performing a refresh operation on an SMR band of HDD 100, according to an embodiment. In some embodiments, some of the methods steps can be consistent with or performed in lieu of steps 505-509 of FIG. 5. FIGS. 10A-10D conceptually illustrate a target SMR band 1010 and a spare SMR band 1020 of HDD 100 at various times during the method steps, according to various embodiments.

Although the method steps are described in conjunction with HDD 100 of FIGS. 1-6C, persons skilled in the art will understand that the method steps may be performed with other types of systems. The control algorithms for the method steps reside in a suitable controller, such as microprocessor-based controller 133 and/or PLP system 138. Such control algorithms may reside in whole or in part as software- or firmware-implemented logic, and/or as hardware-implemented logic circuits.

Prior to the method steps, a refresh operation is begun on a target SMR band 1010. For example, in some embodiments, the controller may determine that the refresh operation is required for target SMR band 1010 in a fashion consistent with step 501 of FIG. 5.

Figure 10A:
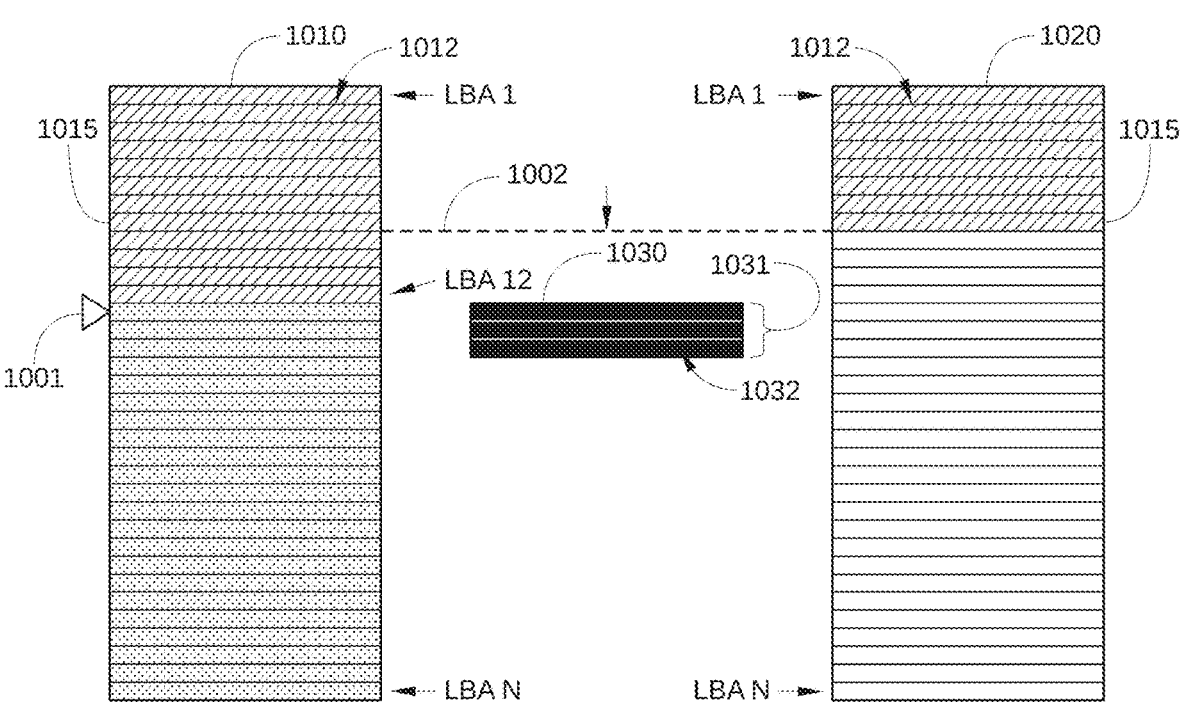
FIGS. 10A-10D conceptually illustrate a target SMR band and a spare SMR band of an HDD at various times during the method steps of FIG. 9, according to various embodiments.

FIG. 10A conceptually illustrates target SMR band 1010 juxtaposed with a spare SMR band 1020 after the refresh operation being performed on target SMR band 1010 has begun and HDD 100 has received a write command 1030, according to an embodiment. In the embodiment illustrated in FIG. 10A, write command 1030 includes new host data (write data 1032) that is to be stored in an LBA range 1031 within target SMR band 1010, in a fashion consistent with step 503 of FIG. 5. In some embodiments, target SMR band 1010 and spare SMR band 1020 are consistent with target SMR band 810 and spare SMR band 820 of FIGS. 8A-8C. Target SMR band 1010 includes an LBA space that has a total of N LBAs and spans a range of LBAs from LBA 1 to LBA N. As shown, target SMR band 1010 includes host data 1012 that have been written sequentially to target SMR band 1010, starting at LBA 1 and ending at LBA 12. A write pointer 1001 associated with target SMR band 1010 indicates that LBA 12 is the end of the LBAs of target SMR band 1010 that store host data 1012. In some embodiments, starting at the LBA indicated by write pointer 1001, the LBAs of target SMR band 1010 store dummy data.

In the embodiment illustrated in FIG. 10A, the refresh operation has been completed up to a flush-extent LBA 1002, where flush-extent LBA 1002 indicates a last LBA 1015 that has been copied to spare SMR band 1020 during the refresh operation. As shown, as a result of the refresh operation, spare SMR band 1020 stores a partial copy of host data 1012. In the embodiment illustrated in FIG. 10A, LBA range 1031 referenced by write command 1030 spans a portion of the LBA space of target SMR band 1010 that is after the current value of flush-extent LBA 1002.

Returning to FIG. 9, a method 900 begins at step 901, when a suitable controller associated with HDD 100 determines that LBA range 1031 referenced by write command 1030 spans a portion of the LBA space of target SMR band 1010 that is after the current value of flush-extent LBA 1002. Thus, LBA range 1031 referenced by write command 1030 has a second position as described above in conjunction with FIG. 6A. In some embodiments, the controller determines that LBA range 1031 has the second position relative to the current value of flush-extent LBA 1002 in a fashion consistent with step 505 of FIG. 5.

Figure 10B:
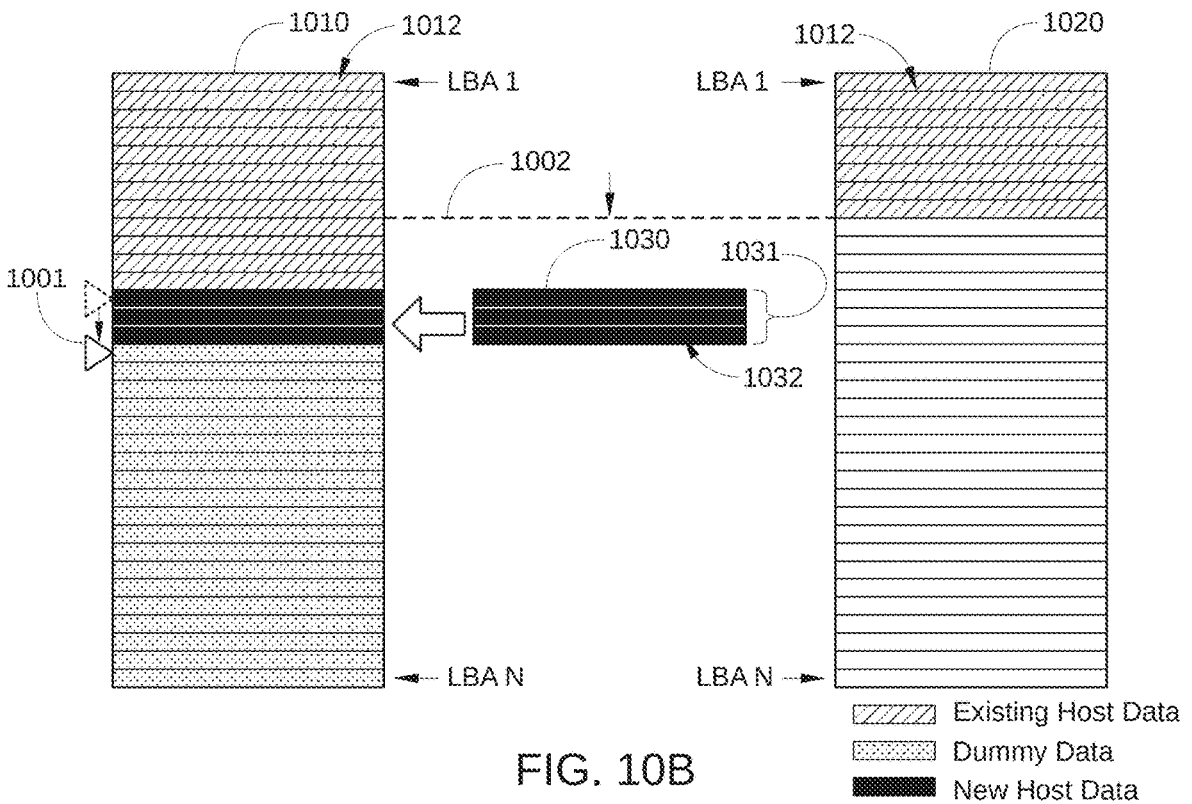

In step 902, the controller stores write data 1032 in LBA range 1031 of target SMR band 1010, as shown in FIG. 10B. FIG. 10B conceptually illustrates target SMR band 1010 and spare SMR band 1020 after HDD 100 stores write data 1032 in LBA range 1031 within target SMR band 1010, according to an embodiment. In step 902 the controller resets write pointer 1001 to the end of LBA range 1031, as shown in FIG. 10B. Thus, subsequent writes to target SMR band 1010 begin at the next LBA of target SMR band 1010 after LBA range 1031, which is indicated by write pointer 1001. It is noted that flush-extent LBA 1002 is not repositioned in response to write data 1032 being written to LBA range 1031 within target SMR band 1010.

In step 903, in some embodiments the controller transmits a message to host 108 indicating that write command 1030 has been completed. Thus, HDD 100 notifies host 108 that write data 1032 is stored in a nonvolatile location and cannot be lost due to unexpected power loss to HDD 100. In embodiments in which HDD 100 does not include a persistent write cache and for which write caching is disabled, the controller generally does not transmit a message to host 108 indicating that write command 1030 has been completed until after completion of method 900.

Figure 10C:
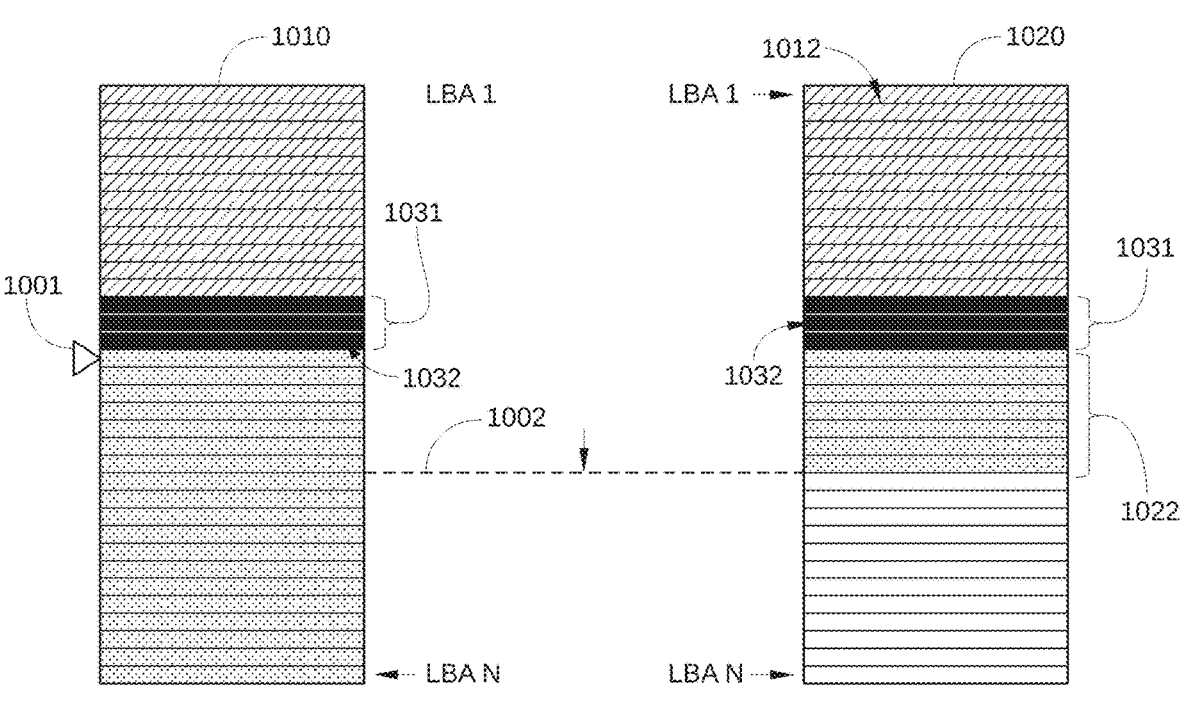
Figure 10D:
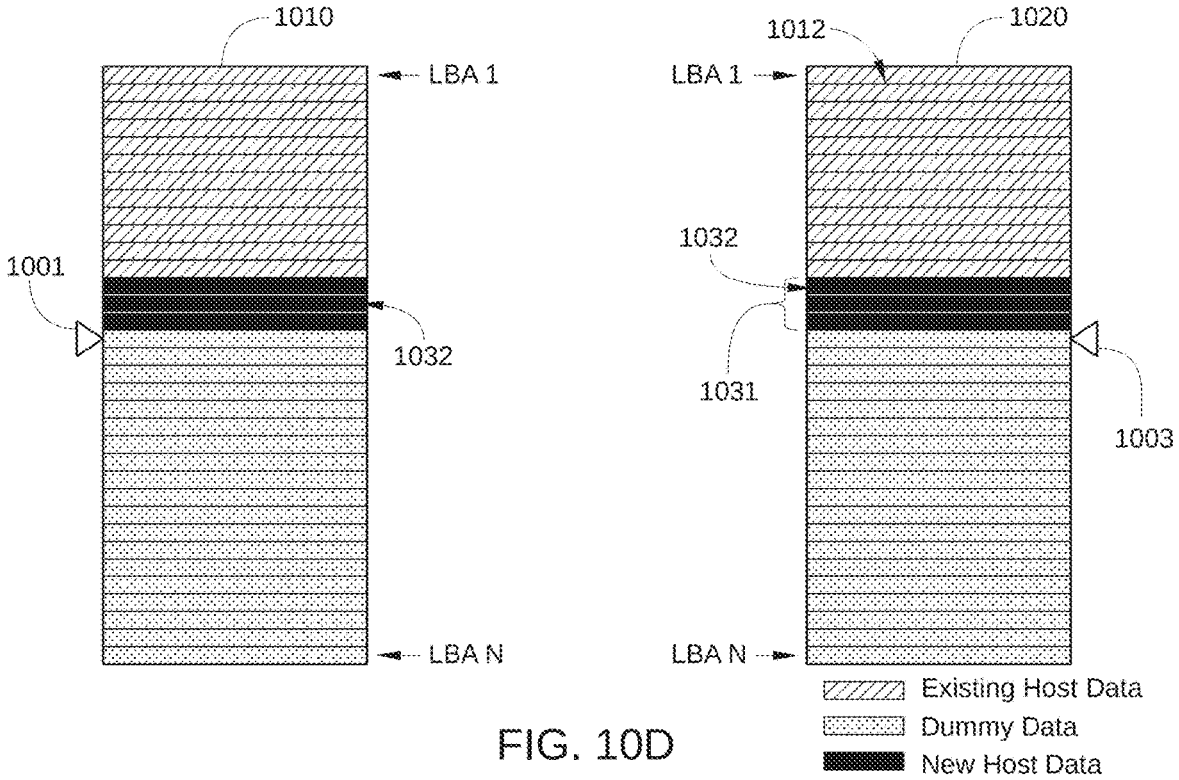

In step 904, the controller resumes the refresh operation, starting at flush-extent LBA 1002. As the refresh operation continues, data from target SMR band 1010 are copied to spare SMR band 1020 and flush-extent LBA 1002 is incremented toward LBA N. FIG. 10C conceptually illustrates target SMR band 1010 and spare SMR band 1020 after HDD 100 has resumed the refresh operation on target SMR band 1010, according to an embodiment. As shown, data stored in target SMR band 1010 up to the current position of flush-extent LBA 1002 is copied to spare band 1020. Write data 1032 are copied to LBA range 1031 of spare SMR band 1020 and dummy data are stored in a remainder portion 1022 of spare SMR band 1020. In step 905, the controller completes the refresh operation, and spare SMR band 1020 replaces target SMR band 1010 as the storage location of host data 1012 and write data 1032. As shown in FIG. 10D, upon completion of the refresh operation, a write pointer 1003 for spare SMR band 1020 has the same position as write pointer 1001 for target SMR band 1010.

Figure 12A:
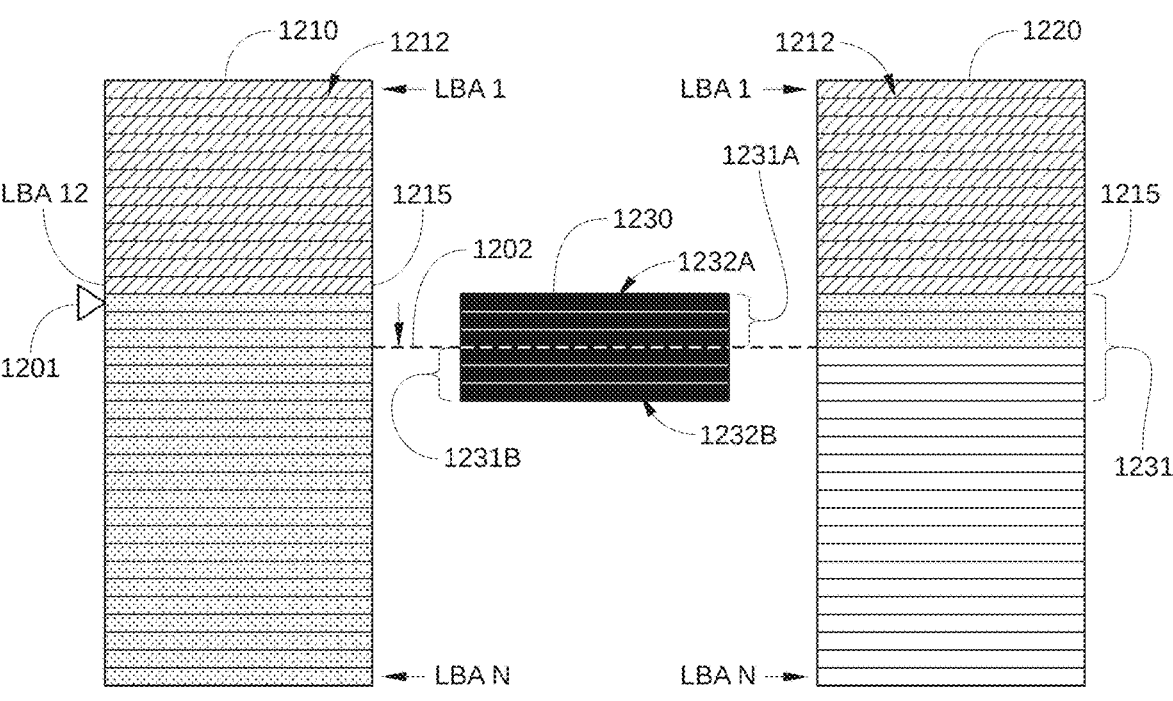
Figure 12B:
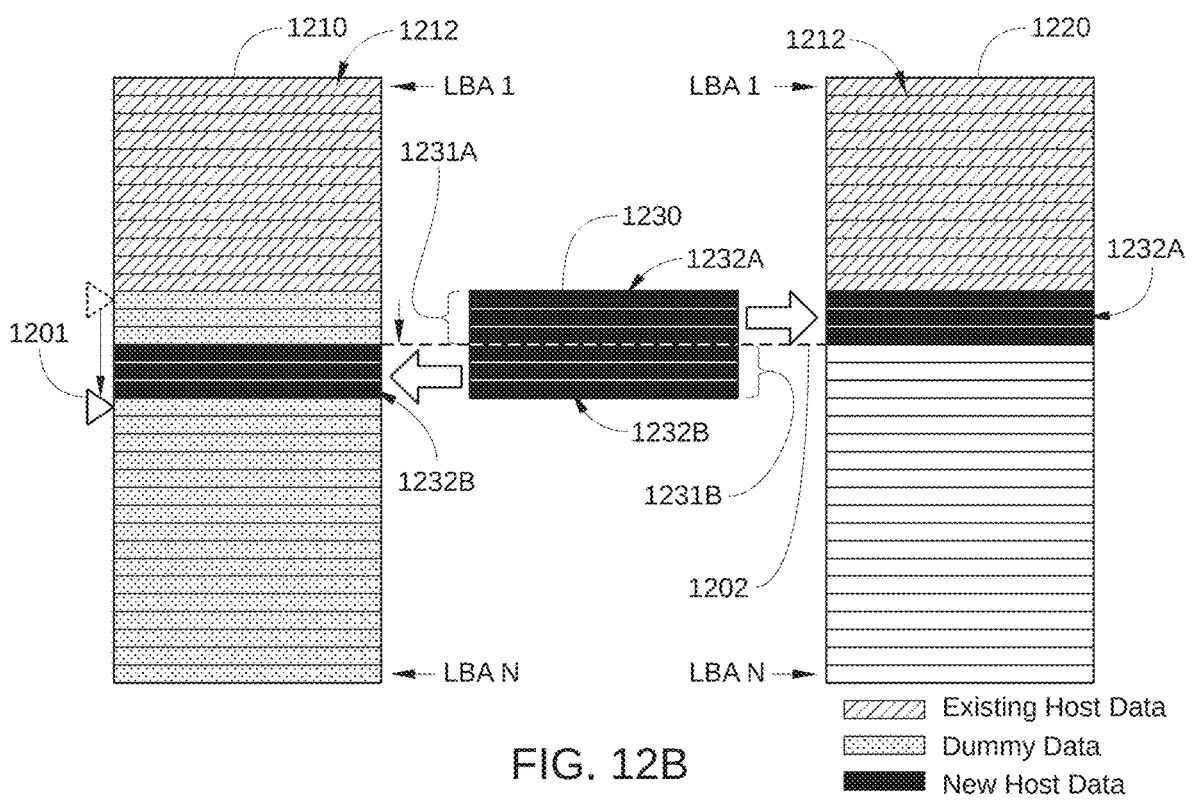

First Embodiment for Handling Write Command when Write Command is in Third Position FIG. 11 sets forth a flowchart of method steps for performing a refresh operation on an SMR band of HDD 100, according to an embodiment. In some embodiments, some of the methods steps can be consistent with or performed in lieu of steps 505-509 of FIG. 5. FIGS. 12A-12C conceptually illustrate a target SMR band 1210 and a spare SMR band 1220 of HDD 100 at various times during the method steps, according to various embodiments.

Although the method steps are described in conjunction with HDD 100 of FIGS. 1-6C, persons skilled in the art will understand that the method steps may be performed with other types of systems. The control algorithms for the method steps reside in a suitable controller, such as microprocessor-based controller 133 and/or PLP system 138. Such control algorithms may reside in whole or in part as software- or firmware-implemented logic, and/or as hardware-implemented logic circuits.

Prior to the method steps, a refresh operation is begun on a target SMR band 1210. For example, in some embodiments, the controller may determine that the refresh operation is required for target SMR band 1210 in a fashion consistent with step 501 of FIG. 5.

FIG. 12A conceptually illustrates target SMR band 1210 juxtaposed with a spare SMR band 1220 after the refresh operation being performed on target SMR band 1210 has begun and HDD 100 has received a write command 1230, according to an embodiment. In the embodiment illustrated in FIG. 12A, write command 1230 includes new host data that is to be stored in an LBA range 1231 within target SMR band 1210, in a fashion consistent with step 503 of FIG. 5. The new host data include write data associated with write command 1230 that has a first portion of write data 1232A a second portion of write data 1232B.

In some embodiments, target SMR band 1210 and spare SMR band 1220 are consistent with target SMR band 810 and spare SMR band 820 of FIGS. 8A-8C. Target SMR band 1210 includes an LBA space that has a total of N LBAs and spans a range of LBAs from LBA 1 to LBA N. As shown, target SMR band 1210 includes host data 1212 that have been written sequentially to target SMR band 1210, starting at LBA 1 and ending at LBA 12. A write pointer 1201 associated with target SMR band 1210 indicates that LBA 12 is the end of the LBAs of target SMR band 1210 that store host data 1212. In some embodiments, starting at the LBA indicated by write pointer 1201, the LBAs of target SMR band 1210 store dummy data.

In the embodiment illustrated in FIG. 12A, the refresh operation has been completed up to a flush-extent LBA 1202, where flush-extent LBA 1202 indicates a last LBA 1215 that has been rewritten to spare SMR band 1220 during the refresh operation. As shown, as a result of the refresh operation, spare SMR band 1220 stores a copy of host data 1212.

In the embodiment illustrated in FIG. 12A, write data associated with write command 1230 includes first portion of write data 1232A, which is to be stored in a first portion of LBA range 1231A and second portion of write data 1232B, which is to be stored in a second portion of LBA range 1231B. As shown, first portion of LBA range 1231A is located before the current value of flush-extent LBA 1202 and second portion of LBA range 1231B is located after the current value of flush-extent LBA 1202. Thus, LBA range 1231 of write command 1230 has a third position relative to flush-extent LBA 1202 as described above in conjunction with FIG. 6C and spans LBAs located before, after, and including flush-extent LBA 1202.

Returning to FIG. 11, a method 1100 begins at step 1101, when a suitable controller associated with HDD 100 determines that LBA range 1231 referenced by write command 1230 spans a first portion of the LBA space of target SMR band 1210 that is prior to the current value of flush-extent LBA 1202 and a second portion of the LBA space of target SMR band 1210 that is after the current value of flush-extent LBA 1202. Thus, LBA range 1231 referenced by write command 1230 has a third position as described above in conjunction with FIG. 6C. In some embodiments, the controller determines that LBA range 1231 has the third position relative to the current value of flush-extent LBA 1202 in a fashion consistent with step 505 of FIG. 5.

In step 1102, the controller stores first portion of write data 1232A in first portion of LBA range 1231A of spare SMR band 1220, as shown in FIG. 12B. FIG. 12B conceptually illustrates target SMR band 1210 and spare SMR band 1220 after HDD 100 stores first portion of write data 1232A and second portion of write data 1232B in LBA range 1231 within target SMR band 1210 and spare SMR band 1220, according to an embodiment. In step 1103, the controller stores second portion of write data 1232B in second portion of LBA range 1231B of target SMR band 1220, which is shown in FIG. 12B. In step 1103 the controller also resets write pointer 1201 to the end of LBA range 1231, as shown. Thus, subsequent writes to target SMR band 1210 begin at the next LBA of target SMR band 1210 after LBA range 1231, which is indicated by write pointer 1201. It is noted that in step 1103, dummy data previously stored in the first portion of LBA range 1231A of spare SMR band 1220 as part of the refresh operation is overwritten by first portion of write data 1232A. Further, in step 1103, flush-extent LBA 1202 is not repositioned. Thus, flush-extent LBA 1202 indicates the resume location of the refresh operation to be the first LBA after the first portion of LBA range 1231A.

In step 1104, in some embodiments the controller transmits a message to host 108 indicating that write command 1230 has been completed. Thus, HDD 100 notifies host 108 that the write data associated with write command 1230 is stored in a nonvolatile location and cannot be lost due to unexpected power loss to HDD 100. In embodiments in which HDD 100 does not include a persistent write cache and for which write caching is disabled, the controller generally does not transmit a message to host 108 indicating that write command 1230 has been completed until after completion of method 1100.

In step 1105, the controller resumes the refresh operation, starting at flush-extent LBA 1202. As the refresh operation continues, data from target SMR band 1210 are copied to spare SMR band 1220 and flush-extent LBA 1202 is incremented toward LBA N.

In step 1106, the controller completes the refresh operation, as shown in FIG. 12C, according to an embodiment. FIG. 12C conceptually illustrates target SMR band 1210 and spare SMR band 1220 after HDD 100 has completed the refresh operation on target SMR band 1210, according to an embodiment. Upon completion of the refresh operation, first portion of write data 1232A is to be stored in first portion of LBA range 1231A of spare SMR band 1220 and second portion of write data 1232B is stored in second portion of LBA range 1231B of spare SMR band 1220. Further, a write pointer 1203 for spare SMR band 1220 has the same position in LBA space as write pointer 1201 for target SMR band 1210. In addition, spare SMR band 1220 replaces target SMR band 1210 as the storage location of host data 1212 and write data 1232.

Figure 14A:
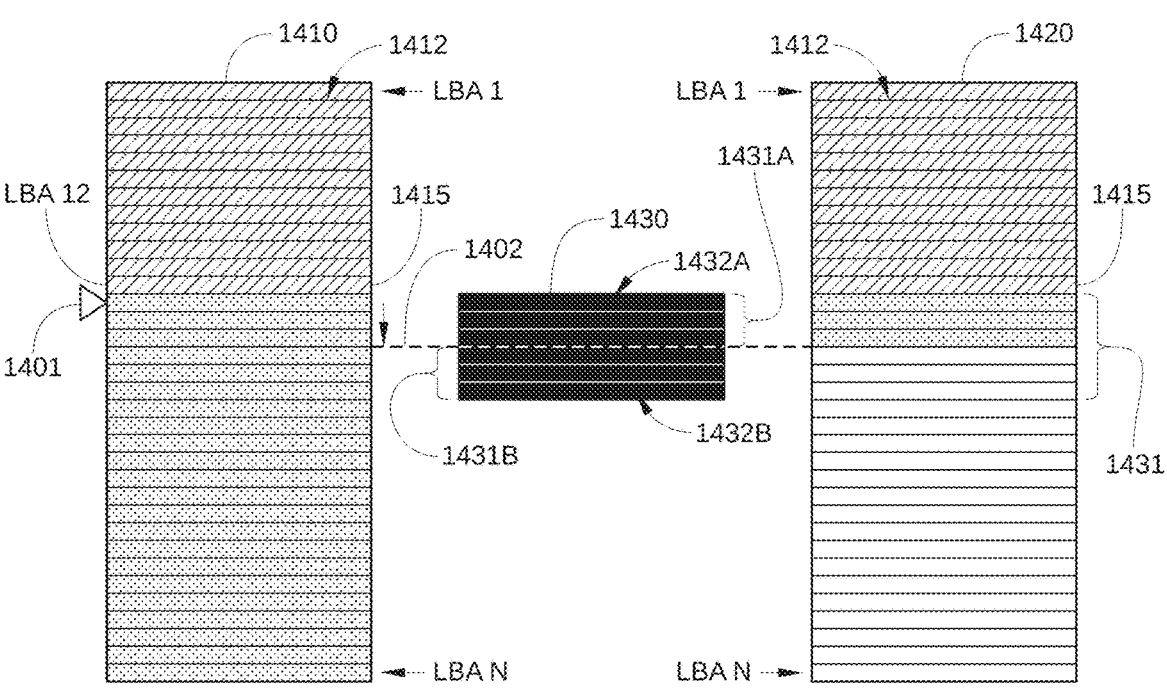
FIGS. 14A-14D conceptually illustrate a target SMR band and a spare SMR band of an HDD at various times during the method steps of FIG. 13, according to various embodiments.
Figure 14B:
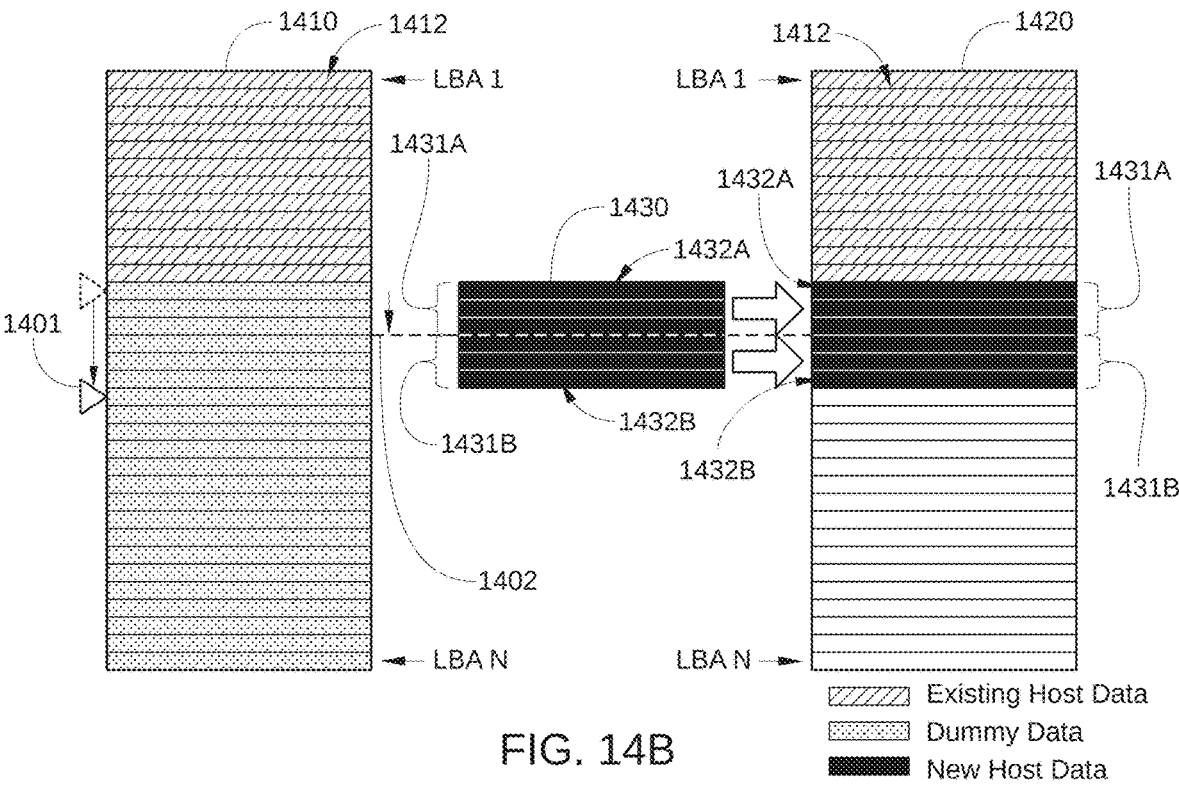
Figure 14C:
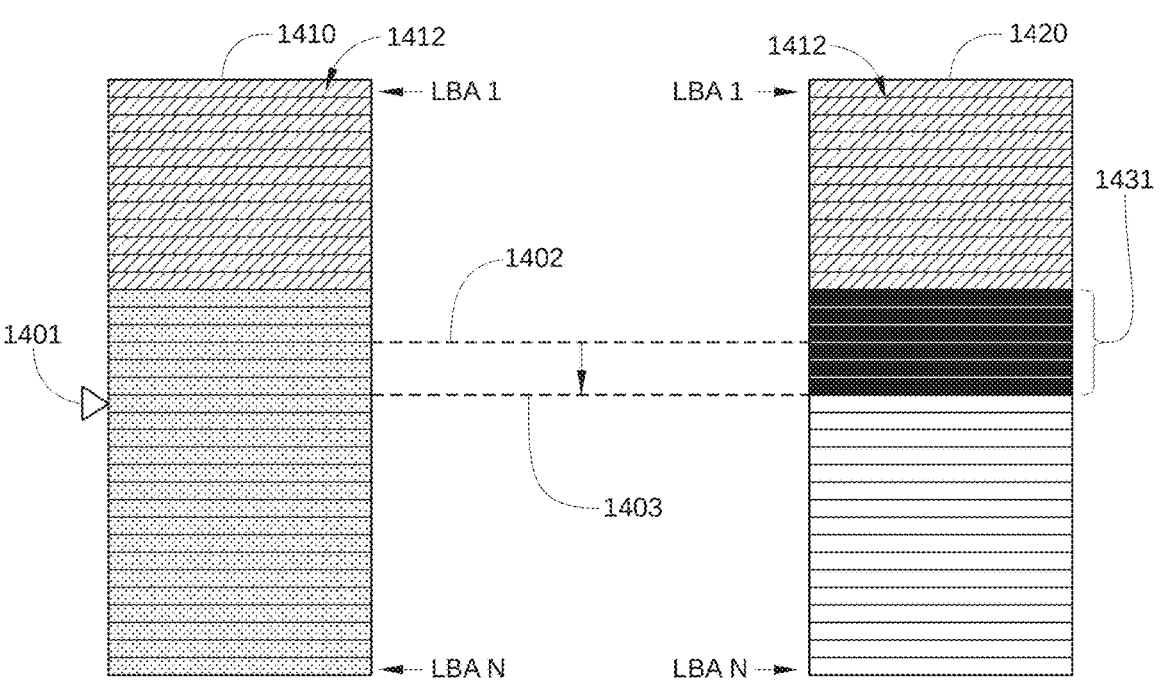

Second Embodiment for Handling Write Command when Write Command is in Third Position FIG. 13 sets forth a flowchart of method steps for performing a refresh operation on an SMR band of HDD 100, according to an embodiment. In some embodiments, some of the methods steps can be consistent with or performed in lieu of steps 505-509 of FIG. 5. FIGS. 14A-14C conceptually illustrate a target SMR band 1410 and a spare SMR band 1420 of HDD 100 at various times during the method steps, according to various embodiments.

Although the method steps are described in conjunction with HDD 100 of FIGS. 1-6C, persons skilled in the art will understand that the method steps may be performed with other types of systems. The control algorithms for the method steps reside in a suitable controller, such as microprocessor-based controller 133 and/or PLP system 138. Such control algorithms may reside in whole or in part as software- or firmware-implemented logic, and/or as hardware-implemented logic circuits.

Prior to the method steps, a refresh operation is begun on a target SMR band 1410. For example, in some embodiments, the controller may determine that the refresh operation is required for target SMR band 1410 in a fashion consistent with step 501 of FIG. 5.

FIG. 14A conceptually illustrates target SMR band 1410 juxtaposed with a spare SMR band 1420 after the refresh operation being performed on target SMR band 1410 has begun and HDD 100 has received a write command 1430, according to an embodiment. In the embodiment illustrated in FIG. 14A, write command 1430 includes new host data that are to be stored in an LBA range 1431 within target SMR band 1410, in a fashion consistent with step 503 of FIG. 5. The new host data include write data associated with write command 1430 that has a first portion of write data 1432A a second portion of write data 1432B.

In some embodiments, target SMR band 1410 and spare SMR band 1420 are consistent with target SMR band 810 and spare SMR band 820 of FIGS. 8A-8C. Target SMR band 1410 includes an LBA space that has a total of N LBAs and spans a range of LBAs from LBA 1 to LBA N. As shown, target SMR band 1410 includes host data 1412 that have been written sequentially to target SMR band 1410, starting at LBA 1 and ending at LBA 12. A write pointer 1401 associated with target SMR band 1410 indicates that LBA 12 is the end of the LBAs of target SMR band 1410 that store host data 1412. In some embodiments, starting at the LBA indicated by write pointer 1401, the LBAs of target SMR band 1410 store dummy data.

In the embodiment illustrated in FIG. 14A, the refresh operation has been completed up to a flush-extent LBA 1402, where flush-extent LBA 1402 indicates a last LBA 1415 that has been written to spare SMR band 1420 during the refresh operation. As shown, as a result of the refresh operation, spare SMR band 1420 stores a copy of host data 1412.

In the embodiment illustrated in FIG. 14A, write data associated with write command 1430 includes first portion of write data 1432A that is to be stored in a first portion of LBA range 1431A and second portion of write data 1432B that is to be stored in a second portion of LBA range 1431B. As shown, first portion of LBA range 1431A is located before the current value of flush-extent LBA 1402 and second portion of LBA range 1431B is located after the current value of flush-extent LBA 1402. Thus, LBA range 1431 of write command 1430 has a third position relative to flush-extent LBA 1402 as described above in conjunction with FIG. 6C and spans LBAs located before, after, and including flush-extent LBA 1402.

Returning to FIG. 13, a method 1300 begins at step 1301, when a suitable controller associated with HDD 100 determines that LBA range 1431 referenced by write command

1430 spans a first portion of the LBA space of target SMR band 1410 that is prior to the current value of flush-extent LBA 1402 and a second portion of the LBA space of target SMR band 1410 that is after the current value of flush-extent LBA 1402. Thus, LBA range 1431 referenced by write command 1430 has a third position as described above in conjunction with FIG. 6C. In some embodiments, step 1301 is consistent with step 1101 of FIG. 11.

In step 1302, the controller stores first portion of write data 1432A in first portion of LBA range 1431A of spare SMR band 1420 and second portion of write data 1432B in second portion of LBA range 1431B of spare SMR band 1420, as shown in FIG. 14B. FIG. 14B conceptually illustrates target SMR band 1410 and spare SMR band 1420 after HDD 100 stores write data associated with write command 1430 in LBA range 1431 within spare SMR band 1420, according to an embodiment. It is noted that, in step 1302, the controller also resets write pointer 1401 to the end of LBA range 1431, as shown. Thus, subsequent writes to target SMR band 1410 begin at the next LBA of target SMR band 1410 after LBA range 1431, which is indicated by write pointer 1401. Consequently, if there is unexpected power loss to HDD 100 before completion of the refresh operation and HDD 100 has no power-loss protection capabilities, target SMR band 1410 has not been modified and can be used normally by storing new host data at the LBA indicated by write pointer 1401. Thus, subsequent writes to target SMR band 1410 begin at the next LBA of target SMR band 1410 after LBA range 1431, which is indicated by write pointer 1401. Alternatively, in some embodiments, in step 1302, the controller does not write pointer 1401 to the end of LBA range 1431. In such embodiments, HDD 100 maintains two pointers associated with the refresh operation: write pointer 1401 for target SMR band 1410 and a write pointer 1405 for spare SMR band 1420.

In step 1303, flush-extent LBA 1402 is repositioned to the end of LBA range 1431, as shown in FIG. 14C. FIG. 14C conceptually illustrates target SMR band 1410 and spare SMR band 1420 after flush-extent LBA 1402 is repositioned, according to an embodiment. In FIG. 14C, flush-extent LBA 1402 is changed to reset flush-extent LBA 1403, which indicates the last LBA of LBA range 1431. As a result, when the refresh operation on target SMR band 1410 resumes, data from target SMR band 1410 are copied to spare SMR band 1420 starting at reset flush-extent LBA 1403.

In step 1304, in some embodiments, the controller transmits a message to host 108 indicating that write command 1430 has been completed. Thus, HDD 100 notifies host 108 that write data 1432 is stored in a nonvolatile location and cannot be lost due to unexpected power loss to HDD 100. In embodiments in which HDD 100 does not include a persistent write cache and for which write caching is disabled, the controller generally does not transmit a message to host 108 indicating that write command 1430 has been completed until after completion of method 1300.

Figure 14D:
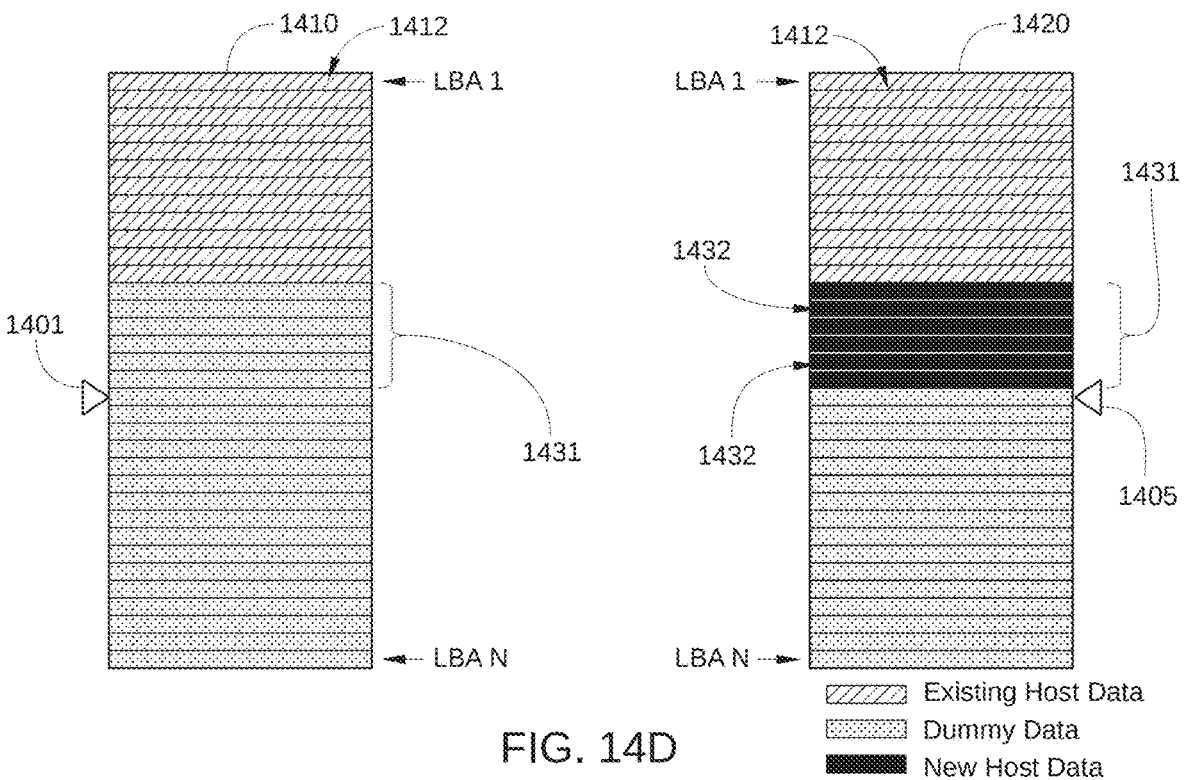

In step 1305, the controller resumes the refresh operation, starting at reset flush-extent LBA 1403. As the refresh operation continues, data from target SMR band 1410 are copied to spare SMR band 1420 and reset flush-extent LBA 1403 is incremented toward LBA N. In step 1306, the controller completes the refresh operation, as shown in FIG. 14D, according to an embodiment. FIG. 14D conceptually illustrates target SMR band 1410 and spare SMR band 1420 after HDD 100 has completed the refresh operation on target SMR band 1410, according to an embodiment. It is noted that, upon completion of the refresh operation, write pointer

1405 for spare SMR band 1420 has the same position in LBA space as write pointer 1401 for target SMR band 1410. In addition, upon completion of the refresh operation, spare SMR band 1420 replaces target SMR band 1410 as the storage location of host data 1412 and write data 1432.

In sum, implementation of one or more embodiments described herein enable the efficient execution of a write command for storage in a target SMR band when the target SMR band is undergoing a refresh operation. The write command can be quickly executed when the write command spans a portion of the LBA space of the target SMR band that is prior to the current value of a flush-extent LBA, when the write command spans a portion of the LBA space of the target SMR band that is after the current value of the flush-extent LBA, or when the write command spans a first portion of the LBA space of the target SMR band that is prior to the current value of the flush-extent LBA and a second portion of the LBA space of the target SMR band that is after the current value of the flush-extent LBA. As a result, write command latency is associated with pausing the write command until the refresh operation completes is avoided.

While the foregoing is directed to embodiments of the present invention, other and further embodiments of the invention may be devised without departing from the basic scope thereof, and the scope thereof is determined by the claims that follow.

We claim:

1. A method of storing data in a magnetic disk drive with a shingled magnetic recording (SMR) region that includes a plurality of SMR bands, the method comprising:

starting a refresh operation for a first SMR band in the plurality of SMR bands, wherein the refresh operation includes reading host data from the first SMR band and writing the host data from the first SMR band to a second SMR band in the plurality of SMR bands;

while performing the refresh operation, receiving a write command from a host that references a logical block address (LBA) range associated with the first SMR band and includes write data for the LBA range;

in response to receiving the write command, suspending the refresh operation;

while the refresh operation is suspended, storing the write data for the LBA range in at least one of the first SMR band and the second SMR band; and after storing the write data for the LBA range, resuming the refresh operation.

2. The method of claim 1, further comprising, prior to storing the write data for the LBA range in at least one of the first SMR band and the second SMR band, storing the write data in a protected solid-state memory included in the magnetic disk drive.

3. The method of claim 2, wherein the protected solid-state memory comprises one of a non-volatile solid-state memory or a region of a volatile solid-state memory that is associated with a power-loss-protection circuit.

4. The method of claim 3, wherein storing the write data in the protected solid-state memory comprises adding memory locations in the region of the volatile solid-state memory that store the write data to a list of protected memory locations from which stored data are moved to the non-volatile memory in response to a power loss event.

5. The method of claim 2, wherein storing the write data for the LBA range in at least one of the first SMR band and the second SMR band comprises reading the write data from the protected solid-state memory.

6. The method of claim 1, further comprising determining that the LBA range is less than a flush-extent LBA for the refresh operation, wherein storing the write data for the LBA range in at least one of the first SMR band and the second SMR band comprises storing the write data for the LBA range in the second SMR band.

7. The method of claim 6, wherein resuming the refresh operation comprises:

determining a new flush-extent LBA for the refresh operation that corresponds to the last LBA of the LBA range;

reading a remainder portion of the host data from the first SMR band, wherein the remainder portion begins at the new flush-extent LBA; and writing the remainder portion to the second SMR band.

8. The method of claim 1, further comprising determining that the LBA range is greater than a flush-extent LBA for the refresh operation, wherein storing the write data for the LBA range in at least one of the first SMR band and the second SMR band comprises storing the write data for the LBA range in the first SMR band.

9. The method of claim 8, wherein resuming the refresh operation comprises:

reading a remainder portion of the write data from the first SMR band, wherein the remainder portion begins at the flush-extent LBA; and writing the remainder portion to the second SMR band.

10. The method of claim 9, wherein the remainder portion includes the write data.

11. The method of claim 1, further comprising determining that a first portion of the LBA range is less than a flush-extent LBA for the refresh operation and a second portion of the LBA range is equal to or greater than the flush-extent LBA for the refresh operation, wherein storing the write data for the LBA range in at least one of the first SMR band and the second SMR band comprises storing a first portion of the write data that corresponds to the first portion of the LBA range in the second SMR band and storing a second portion of the write data that corresponds to the second portion of the LBA range in the first SMR band.

12. The method of claim 11, wherein resuming the refresh operation comprises:

reading a remainder portion of the host data from the first SMR band, wherein the remainder portion begins at the flush-extent LBA; and writing the remainder portion to the second SMR band.

13. The method of claim 12 wherein the remainder portion includes the second portion of the write data.

14. The method of claim 1, further comprising determining that a first portion of the LBA range is less than a flush-extent LBA for the refresh operation and a second portion of the LBA range is equal to or greater than the flush-extent LBA for the refresh operation, wherein storing the write data for the LBA range in at least one of the first SMR band and the second SMR band comprises storing a first portion of the write data that corresponds to the first portion of the LBA range in the second SMR band and storing a second portion of the write data that corresponds to the second portion of the LBA range in the second SMR band.

15. The method of claim 1, wherein resuming the refresh operation comprises:

determining a new flush-extent LBA for the refresh operation that corresponds to the last LBA of the second portion of the LBA range;

reading a remainder portion of the host data from the first SMR band, wherein the remainder portion begins at the new flush-extent LBA; and writing the remainder portion to the second SMR band.

16. The method of claim 1, wherein resuming the refresh operation comprises:

reading a remainder portion of the host data from the first SMR band;

writing the remainder portion to the second SMR band; and after writing the remainder portion to the second SMR band, invalidating data stored in the first SMR band.

17. The method of claim 1, wherein the second SMR band comprises a spare SMR band in the plurality of SMR bands.

18. A magnetic disk drive, comprising:

a shingled magnetic recording region (SMR) that includes a plurality of SMR bands; and a controller configured to perform the steps of:

starting a refresh operation for a first SMR band in the plurality of SMR bands, wherein the refresh operation includes reading host data from the first SMR band and writing the host data from the first SMR band to a second SMR band in the plurality of SMR bands;

while performing the refresh operation, receiving a write command from a host that references a logical block address (LBA) range associated with the first SMR band and includes write data for the LBA range;

in response to receiving the write command, suspending the refresh operation;

while the refresh operation is suspended, storing the write data for the LBA range in at least one of the first SMR band and the second SMR band; and after storing the write data for the LBA range, resuming the refresh operation.

19. The magnetic disk drive of claim 18, wherein the controller is further configured to perform the step of determining that the LBA range is less than a flush-extent LBA for the refresh operation, wherein storing the write data for the LBA range in at least one of the first SMR band and the second SMR band comprises storing the write data for the LBA range in the second SMR band.

20. The magnetic disk drive of claim 18, wherein the controller is further configured to perform the step of determining that the LBA range is greater than a flush-extent LBA for the refresh operation, wherein storing the write data for the LBA range in at least one of the first SMR band and the second SMR band comprises storing the write data for the LBA range in the first SMR band.

* * * * *